(12) United States Patent
Tong et al.

(10) Patent No.: US 7,226,797 B2
(45) Date of Patent: Jun. 5, 2007

(54) SENSING ALIGNMENT OF MULTIPLE LAYERS

(75) Inventors: William M. Tong, San Francisco, CA (US); Wei Wu, Mountain View, CA (US); Jun Gao, Saratoga, CA (US); Carl E. Picciotto, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 10/995,837

(22) Filed: Nov. 23, 2004

(65) Prior Publication Data

US 2006/0110069 A1    May 25, 2006

(51) Int. Cl.
*H01L 21/00* (2006.01)
(52) U.S. Cl. .......................... 438/5; 438/401; 700/121
(58) Field of Classification Search .................... 438/5, 438/6, 7, 16, 401; 430/30; 700/121; 702/158
See application file for complete search history.

(56) References Cited

U.S. PATENT DOCUMENTS

| | | |
|---|---|---|
| 5,149,980 A | 9/1992 | Ertel et al. |
| 5,204,739 A | 4/1993 | Domenicali |
| 6,195,475 B1 | 2/2001 | Beausoleil, Jr. |
| 6,770,899 B2 * | 8/2004 | Hasegawa et al. ..... 250/559.29 |
| 6,941,008 B2 * | 9/2005 | Ando et al. .................. 382/145 |
| 6,941,009 B2 * | 9/2005 | Wienecke ................... 382/149 |
| 7,085,673 B2 * | 8/2006 | Picciotto et al. ............. 702/158 |
| 2004/0021254 A1 | 2/2004 | Sreenivasan et al. |
| 2004/0141168 A1 | 7/2004 | Sreenivasan et al. |

OTHER PUBLICATIONS

Barron, J.L. et. al., "Performance of Optical Flow Techniques," International Journal of Computer Vision 12:1,43-77 (1994).
Jahne, B., Digital Image Processing; Concepts, Algorithms and Scientific Applications, Springer-Verlag (1997) at pp. 395-399, 404-413, and 430-437.
Russ, J., The Image Processing Handbook, 2nd Edition, CRC Press (1995), pp. 57-59.
Vernon, D., Fourier Vision: Segmentation and Velocity Measurement Using the Fourier Transform, Kluwer Academic Publishers (2001), pp. 16-23.
Waser, R., ed., Nanoelectronics and information Technology: Advanced Electronic Materials and Novel Devices, Wiley-VCH Verlag GmbH (2003), pp. 243-244.

* cited by examiner

*Primary Examiner*—Kevin M. Picardat

(57) ABSTRACT

Using an imaging system in relation to a plurality of material layers in an initial alignment state is provided, a first of the plurality of material layers at least partially obscuring a second of the plurality of material layers in the initial alignment state. The first material layer is moved from a first position corresponding to the initial alignment state to a second position out of a field of view of the imaging system, and a first image of the second material layer is stored. The first material layer is moved back the first position to restore the initial alignment state. A second image of the first material layer is acquired. The second image and the stored first image are processed to determine the initial alignment state.

40 Claims, 25 Drawing Sheets

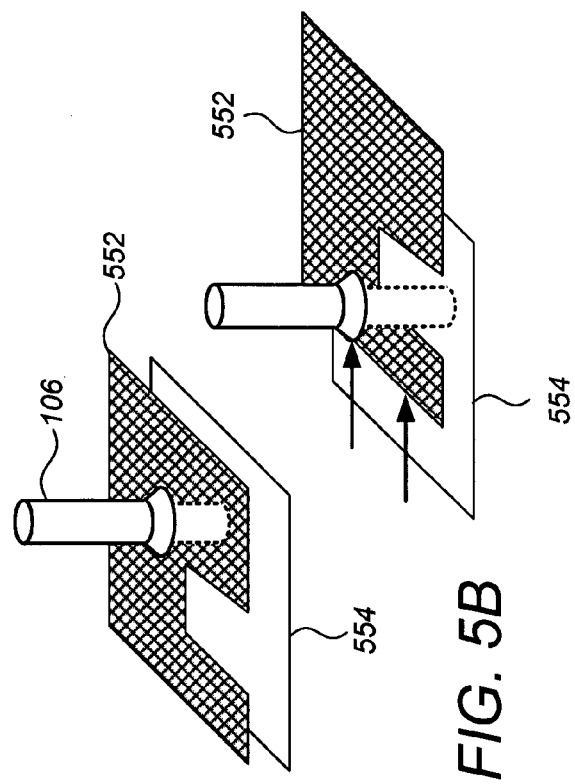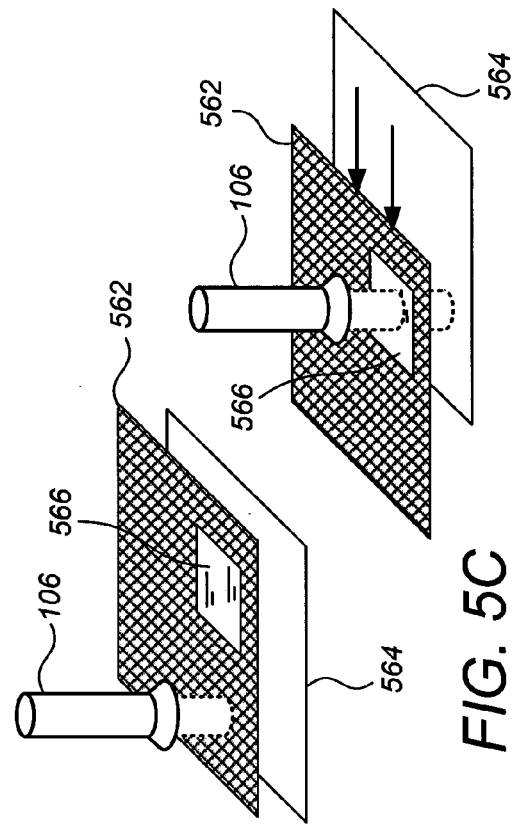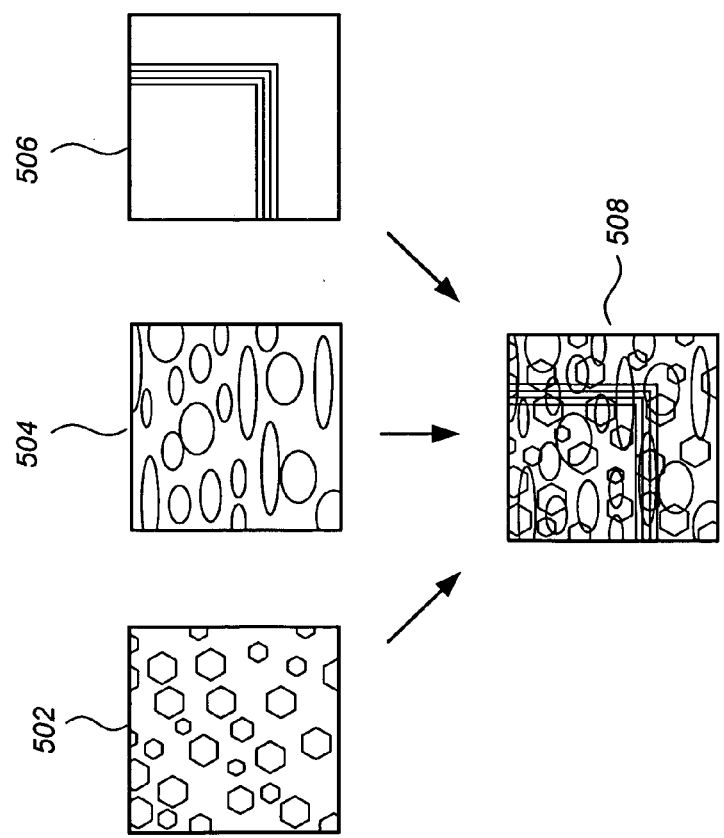
FIG. 5B
FIG. 5C
FIG. 5A

SENSING ALIGNMENT OF MULTIPLE LAYERS

CROSS-REFERENCE TO RELATED APPLICATIONS

The subject matter of this patent specification relates at least in part to the subject matter of U.S. Ser. No. 10/995,840 filed even date herewith, and which is incorporated by reference herein.

FIELD

This patent specification relates to sensing and/or controlling at least one of an alignment state and a relative position shift among multiple material layers using an imaging system.

BACKGROUND

The generation of small devices often involves an alignment of multiple material layers, e.g., two or more material layers, with the assistance of an imaging system. For example, in one scenario, the material layers are positioned substantially parallel to each other and are spaced apart by an amount that is relatively small compared to their overall dimensions. An imaging system having an optical axis perpendicular to the material layers is used to image one or more alignment markers on or within each layer. Relative position is established according to alignment marker positions. Alignment markers can comprise markers provided explicitly for alignment purposes, or can comprise known landmarks identified among features present on the material layer.

One issue can arise in the context of material layers that can obscure other material layers relative to the imaging system. As used herein, a first layer obscures a second layer if a clean image of the second layer cannot be obtained by the imaging system in the presence of the first layer. Depending on the selection of algorithm used for alignment sensing or control, the presence of obscuring material layers may confound performance in the alignment sensing and/or control process. Notably, a first layer may obscure a second layer even if the first layer is positioned below the second layer relative to the imaging system. For example, features or textures of a lower layer may show through an upper layer such that a clean image of upper layer cannot be obtained in the presence of the lower layer.

Other issues that can arise, either alone or in combination with obscuring material layers, relate to the ever-shrinking nature of devices and the ever-changing nature of their fabrication processes. One issue brought about by shrinking feature sizes is that the spacing between material layers may begin to exceed the depth of field of the imaging system used in the alignment process. Another issue is that it may not always be desirable or practical to use alignment markers for sensing device alignment and/or for sensing relative position shifts. At the same time, however, the need for exacting alignment tolerances remains. By way of example, it may be desirable to measure very small changes in an alignment state between layers even where no alignment markers are present.

SUMMARY

In accordance with an embodiment, a method for using an imaging system in relation to a plurality of material layers in an initial alignment state is provided, a first of the plurality of material layers at least partially obscuring a second of the plurality of material layers in the initial alignment state. The first material layer is moved from a first position corresponding to the initial alignment state to a second position out of a field of view of the imaging system, and a first image including at least a portion of the second material layer having a second-layer alignment marker thereon is stored. The first material layer is moved back to the first position to restore the initial alignment state. A second image including at least a portion of the first material layer having a first-layer alignment marker thereon is acquired. The second image and the stored first image are processed to determine the initial alignment state according to positions of the first-layer and second-layer alignment markers.

Also provided is a an apparatus for facilitating positioning of a plurality of substantially parallel layers having an initial alignment state. The apparatus comprises an imaging system having an optical axis extending through the layers, a first of the layers at least partially obscuring a second of the layers with respect to the imaging system when in the initial alignment state. The apparatus further comprises a positioning system displacing the first layer from a first position corresponding to the initial alignment state to a second position out of a field of view of the imaging system, the first layer being maintained out of the field of view as a first image is being acquired by the imaging system including at least a portion of the second material layer having a second-layer alignment marker thereon. The positioning system subsequently moves the first layer back to the first position to restore the initial alignment state. The apparatus further comprises a memory storing the first image. The apparatus further comprises a processor retrieving the first image from the memory and receiving a second image acquired by the imaging system, the second image including at least a portion of the first layer having a first-layer alignment marker thereon. The processor processes the second image and the stored first image to determine the initial alignment state according to positions of the first-layer and second-layer alignment markers.

Also provided is a method for using an imaging system in relation to a plurality of material layers in an initial alignment state, a first of the plurality of material layers having substantially identical surface features as a second of the plurality of material layers, the first material layer at least partially obscuring the second material layer in the initial alignment state. The first material layer is moved from a first position corresponding to the initial alignment state to a second position out of a field of view of the imaging system. A first image including at least a portion of the second material layer is stored. The first material layer is moved back to the first position to restore the initial alignment state. A second image is acquired including at least a portion of the first material layer. The second image and the stored first image are processed to determine an initial relative offset between the first and second material layers in the initial alignment state according to an image displacement sensing algorithm.

Also provided is an apparatus for facilitating positioning of a plurality of substantially identical parallel layers having an initial alignment state. The apparatus comprises an imaging system having an optical axis extending through the layers, a first of the layers at least partially obscuring a second of the layers with respect to the imaging system when in the initial alignment state. The apparatus further comprises a positioning system displacing the first layer from a first position corresponding to the initial alignment state to a second position out of a field of view of the imaging system. The first layer is maintained out of the field of view as a first image is being acquired by the imaging system including at least a portion of the second material layer. The positioning system subsequently moves the first layer back to the first position to restore the initial alignment state. The apparatus further comprises a memory storing the first image. The apparatus further comprises a processor retrieving the first image from the memory and receiving a second image acquired by the imaging system, the second image including at least a portion of the first layer. The processor processes the second image and the stored first image to determine an initial relative offset between the first and second layers in the initial alignment state according to an image displacement sensing algorithm.

Also provided is a method for using an imaging system to determine a relative position shift between a first layer and a second layer caused by a repositioning of the layers from an initial configuration to a subsequent configuration relative to the imaging system. The layers are separated by a distance greater than a depth of field of the imaging system in each of the initial and subsequent configurations. With the imaging system focused on the first layer in the initial configuration, a first image of at least a portion of the first layer is acquired and stored. With the imaging system focused on the second layer in the initial configuration, a second image of at least a portion of the second layer is acquired and stored. With the imaging system focused on the first layer in the subsequent configuration, a third image of the portion of the first layer is acquired and stored. With the imaging system focused on the second layer in the subsequent configuration, a fourth image of the portion of the second layer is acquired. The first and third images are processed to determine a first position shift of the first layer between the initial and subsequent configurations. The second and fourth images are processed to determine a second position shift of the second layer between the initial and subsequent configurations, and the relative position shift between the first and second layers is determined according to the first and second position shifts.

Also provided is an apparatus for determining a relative position shift between a first layer and a second layer caused by a repositioning of the layers from an initial configuration to a subsequent configuration. The apparatus comprises an imaging system having an optical axis extending through the layers, the layers being separated by a distance greater than a depth of field of the imaging system in each of the initial and subsequent configurations. The apparatus further comprises a memory storing a first image of at least a portion of the first layer, the first image acquired with the imaging system focused on the first layer in the initial configuration. The memory further stores a second image of at least a portion of the second layer, the second image acquired with the imaging system focused on the second layer in the initial configuration. The memory further stores a third image of the portion of the first layer, the third image acquired with the imaging system focused on the first layer in the subsequent configuration. The imaging system acquires a fourth image of the portion of the second layer when focused thereon in the subsequent configuration. The apparatus further comprises a processor processing the first and third images to determine a first position shift of the first layer between the initial and subsequent configurations. The processor also processes the second and fourth images to determine a second position shift of the second layer between the initial and subsequent configurations. The processor determines the relative position shift between the first and second layers according to the first and second position shifts.

Also provided is a method for using an imaging system in relation to a plurality of material layers, a first of the plurality of material layers having substantially identical surface features as a second of the plurality of material layers, the first and second material layers being separated by a distance greater than a depth of field of the imaging system. A focal plane is brought into correspondence with the first material layer and a first image is stored including at least a portion of the first material layer. The focal plane is brought into correspondence with the second material layer and a second image is acquired including at least a portion of the second material layer. The stored first image and the second image are processed according to an image displacement sensing algorithm to determine a position of the second material layer relative to the first material layer.

Also provided is an apparatus position sensing in relation to a plurality of substantially identical parallel layers. The apparatus comprises an imaging system having an optical axis extending through the layers, the imaging system having a depth of field less than a separation distance between a first of the layers and a second of the layers, the imaging system acquiring a first image including at least a portion of said first layer while focused on the first layer. The apparatus further comprises a memory storing the first image. The apparatus further comprises a processor retrieving the first image from the memory and receiving a second image acquired by the imaging system while focused on the second layer, the second image including at least a portion of the second layer, the processor processing the second image and the stored first image according to an image displacement sensing algorithm to determine a relative offset between the first and second layers.

Also provided is a method for using an imaging system to determine a relative position shift between a first layer and a second layer caused by a repositioning of the layers from an initial configuration to a subsequent configuration relative to the imaging system, the first layer at least partially obscuring the second layer in the initial configuration. With the first and second layers in the initial configuration, a first image of at least a portion of the first layer is acquired and stored. The first layer is moved from a first position corresponding to the initial configuration to a second position out of a field of view of the imaging system, and a second image of at least a portion of the second layer is acquired and stored. With the first and second layers in the subsequent configuration, a third image of the portion of the first layer is acquired and stored, and a fourth image of the portion of the second layer is acquired. The first and third images are processed to determine a first position shift of the first layer between the initial and subsequent configurations. The second and fourth images are processed to determine a second position shift of the second layer between the initial and subsequent configurations. A relative position shift between the first and second layers is then determined according to the first and second position shifts.

Also provided is an apparatus for determining a relative position shift between a first layer and a second layer caused by a repositioning of the layers from an initial configuration to a subsequent configuration, the first layer at least partially obscuring the second layer in the initial configuration. The apparatus comprises an imaging system having an optical axis extending through the first and second layers, the imaging system acquiring a first image including at least a portion of the first layer in the initial configuration. The apparatus further comprises a positioning system displacing the first layer from a first position corresponding to the initial configuration to a second position out of a field of view of the imaging system, the first layer being maintained out of the field of view as a second image is being acquired by the imaging system including at least a portion of the second material layer, the positioning system subsequently moving the first layer back to the first position to restore the initial configuration. The apparatus further comprises a memory storing the first and second images, the memory further storing a third image of the portion of the first layer acquired by the imaging system in the subsequent configuration, the imaging system acquiring a fourth image of the portion of the second layer in the subsequent configuration. The apparatus further comprises a processor processing the first and third images to determine a first position shift of the first layer between the initial and subsequent configurations, the processor further processing the second and fourth images to determine a second position shift of the second layer between the initial and subsequent configurations, the processor determining the relative position shift between the first and second layers according to the first and second position shifts.

BRIEF DESCRIPTION OF THE DRAWINGS

FIG. 5A illustrates examples of surface textures;

FIGS. 5B and 5C illustrate examples of moving a layer out of a field of view of an imaging system;

DETAILED DESCRIPTION

Figure 1:
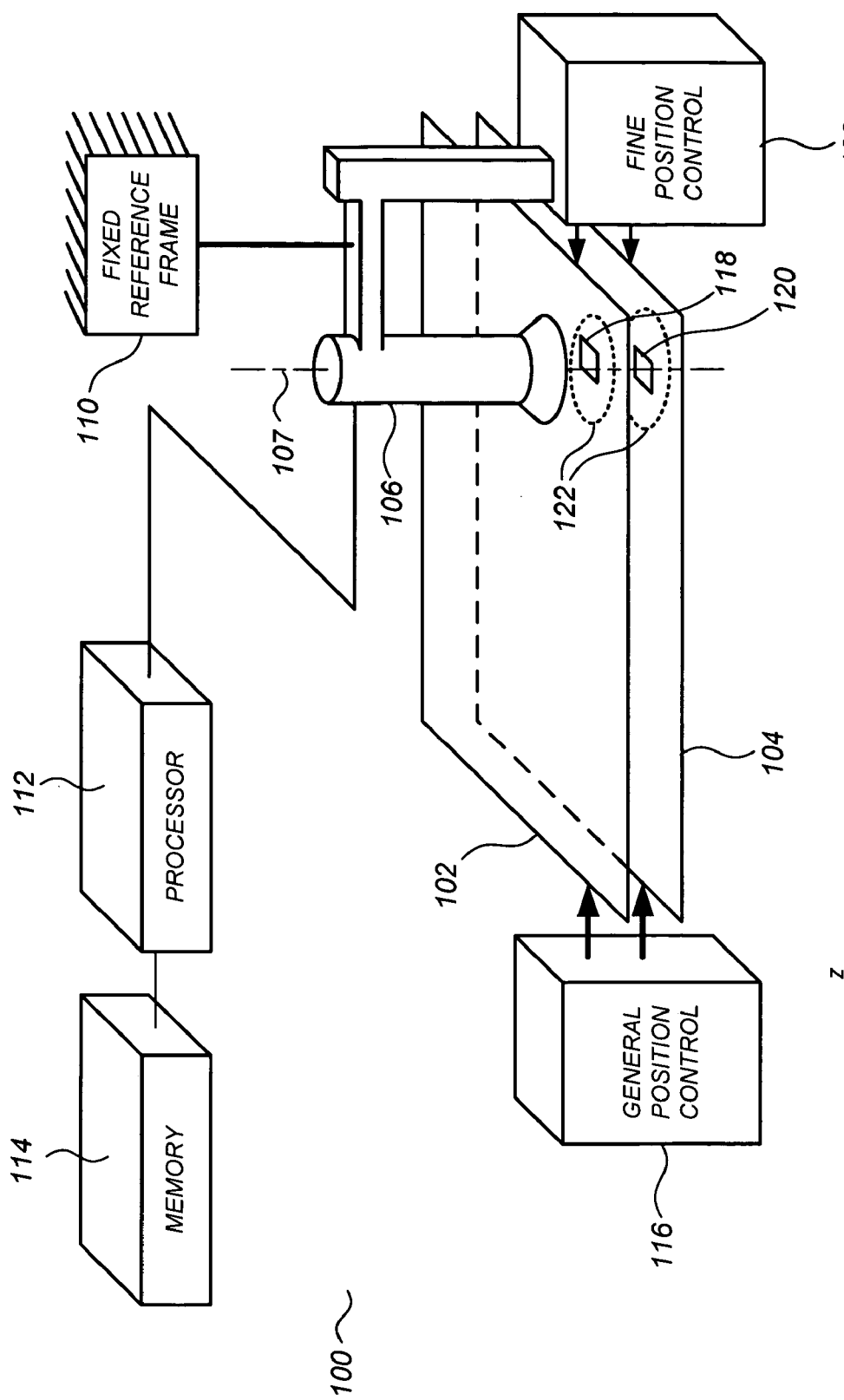
FIG. 1 illustrates an apparatus for determining at least one of an alignment state and a relative position shift between two material layers according to an embodiment.

FIG. 1 illustrates an apparatus 100 for determining at least one of an alignment state and a relative position shift between two layers 102 and 104 according to an embodiment. Apparatus 100 comprises an imaging system 106 having an optical axis 107 extending through the layers 102 and 104. Imaging system 106 is fixed relative to a fixed reference frame 110. It is to be appreciated, of course, that the fixed reference frame 110 may itself be in motion, either in a start-stop sense or a continuous sense, relative to another reference frame such as the floor, a fabrication machine, etc.

In one embodiment, which is described by way of illustration and not by way of limitation, layer 102 is a mold for use in a nanoimprint lithography process. The nanoimprint lithography mold may comprise, for example, a silicon wafer having a layer of $SiO_2$ for use in a hot embossing process, or may comprise a quartz mold for use in an ultraviolet curing-based process. The layer 104 is, for example, a resist-coated substrate. However, it is to be appreciated that the scope of the present teachings is applicable in a wide variety of other scenarios. In another example, the layer 102 can be a mask and the layer 104 can be a sample, respectively, in a proximity or contact lithography system.

In one embodiment, the imaging system 106 comprises a single-objective microscope with a high-NA (numerical aperture) objective lens for achieving submicron resolution or better. The NA can be in the range, for example, of 0.8 to 0.95 for air-immersed samples. The imaging system 106 may have a depth of field of perhaps 2–3 microns. Generally speaking, depth of field refers to a distance range around the focal plane along the optical axis at which imaging can be achieved within a desired lateral resolution. In other embodiments, lower-NA objective lenses may be used having larger field depths. In general, several embodiments herein are advantageous where the depth of field of the imaging system 106 is small compared to the spacing between the layers. Several other embodiments herein are advantageous where the depth of field of the imaging system 106 is comparable to, or greater than, to the spacing between the layers. Illustrated in FIG. 1 is a field of view 122 of the imaging system 106, along with portions 118 and 120, respectively, of the layers 102 and 104 that are within the field of view 122. It is to be appreciated that, as used herein, field of view can refer to a sub-area within a total area imaged by the imaging system 106. Thus, for example, the field of view 760 of FIG. 7, infra, may represent a smaller area within the field of view 122 of FIG. 1.

Apparatus 100 further comprises a fine positioning system 108 capable of translating the layers 102 and 104 by desired distances with fine tolerances at least comparable to the desired tolerances for alignment sensing and/or control. More particularly, if one of the layers 102 or 104, or portion thereof, is in a first position $P_0$ relative to the frame of reference 110 within the field of view of the imaging system 106, the fine positioning system 108 is capable of (i) moving that layer or portion thereof out of the field of view, and then (ii) moving that layer or portion thereof back to the first position $P_0$ within a tolerance $\Delta P$, where $\Delta P$ is comparable to or finer than the desired tolerances for alignment sensing and/or control. By way of example and not by way of limitation, the desired tolerances, and therefore the precision of the fine positioning system 108, may range from the order of several micrometers for some applications to the order of 1 nanometer, or even less, for other applications. In one embodiment, fine positioning system 108 comprises piezoelectric actuators and/or stepper motors geared and controlled, usually with internal feedback control systems, to achieve nanometer-level precision.

A general position control system 116 may be provided in conjunction with the apparatus 100. The general position control system 110 generally provides for more general, larger-scale movements, such as for the complete insertion and withdrawal of the layers 102 and 104 into and out of the apparatus 100. In one embodiment, general position control system 116 comprises a human hand or human-driven positioning tool. In other embodiments the general position control system 116 can be realized by various automated conveyors or other positioning systems associated with micro-fabrication or nano-fabrication. Together, general position control system 116 and the fine position control system 108 can collectively provide the layer movement functionalities described herein. Notably, the functionalities of the general position control system 116 and the fine position control system 108 can be provided by the same device or system. Apparatus 100 further comprises a processor 112 having an associated memory 114 that interacts with the imaging system 106, fine position control system 108, and/or general position control system 116 in accordance with the functionalities described herein.

Figure 2:
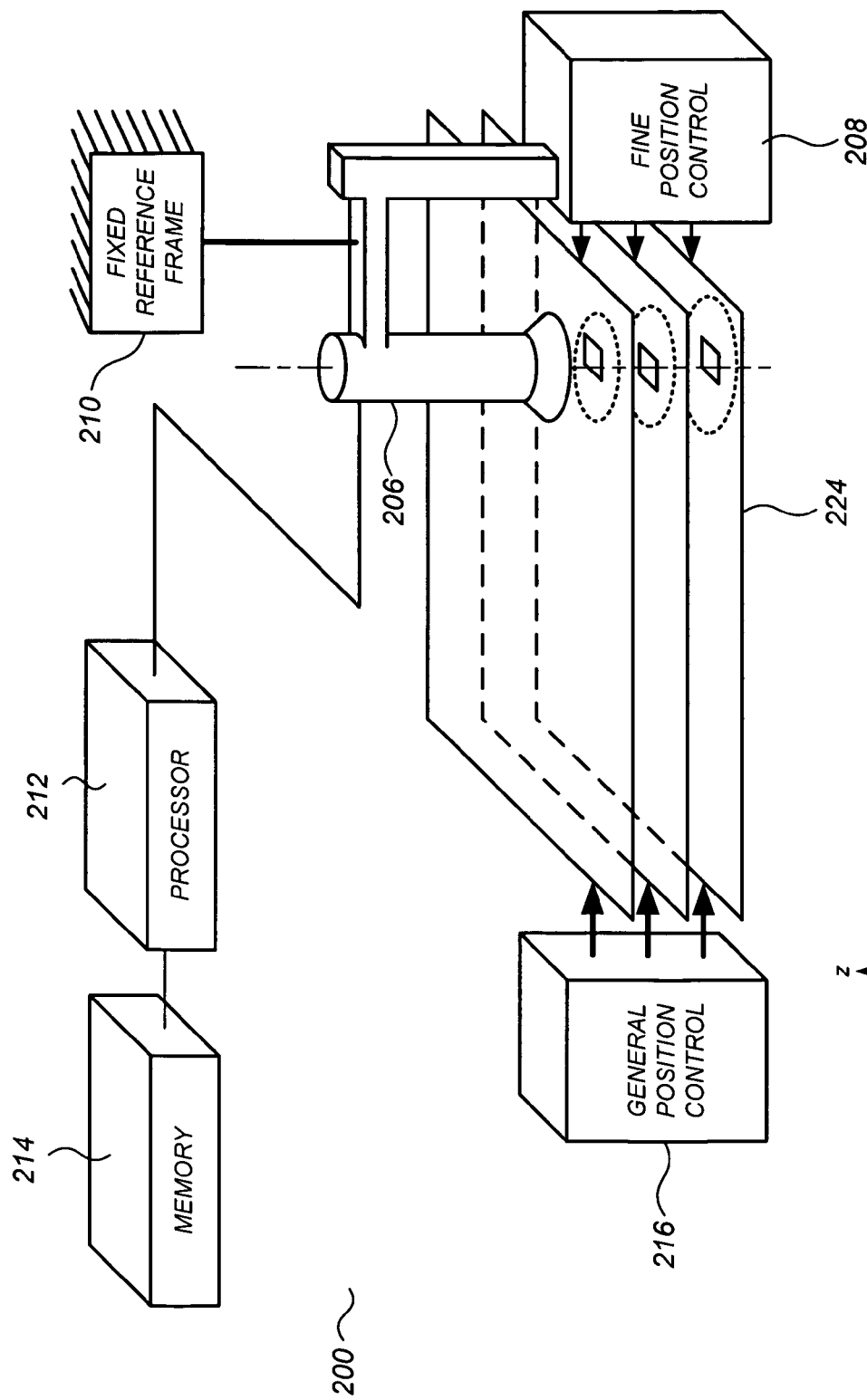
FIG. 2 illustrates an apparatus for determining at least one of an alignment state and a relative position shift among three or more material layers according to an embodiment.

FIG. 2 illustrates an apparatus 200 for determining at least one of an alignment state and a relative position shift among three layers, comprising items 206–216 analogous to items 106–116 of FIG. 1, respectively, with the additional capability of accommodating a third layer 224. In general, the functionalities described herein are readily applicable to the case of three layers, as in FIG. 2, or more layers without departing from the scope of the present teachings. However, for purposes of clarity and not by way limitation, embodiments relating to two material layers are described further herein.

Figure 4:
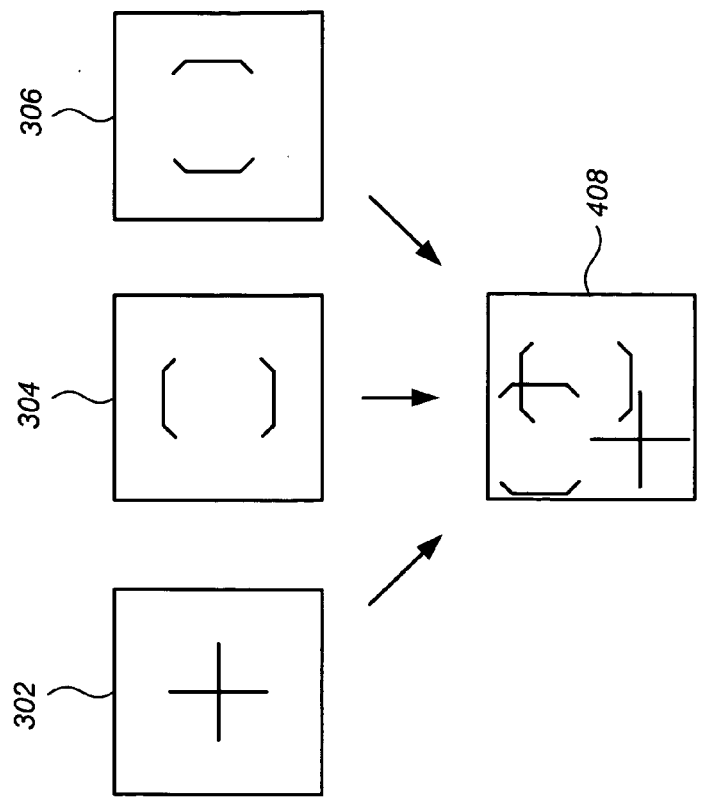
FIGS. 3 and 4 illustrate examples of alignment markers in different alignment states.
Figure 3:
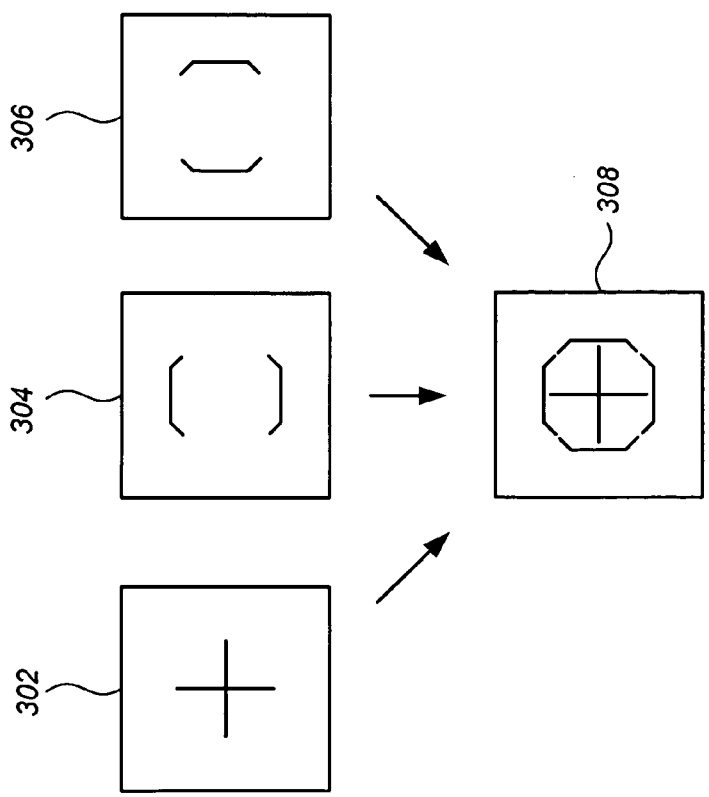

FIGS. 3 and 4 illustrate examples of layers 302, 304, and 306 having alignment markers thereon, as well as composite images 308 and 408 corresponding to hypothetical composite images formed from merging the three layers in their current alignment state. As used herein, alignment state refers to an alignment condition. Thus, any vertical configuration of two or more layers possess an alignment state, by virtue of their being in some type of relative position. It is to be further appreciated that either image 308 or image 408 may reflect a desired state of alignment for the material layers 302–306, depending on the particular application, processes, process history, or other circumstances.

In cases in which a first layer obscures an alignment marker of a second layer, it has been found useful to obviate this occlusion with the assistance of a fine positioning system. In particular, the fine positioning system temporarily moves the first layer to the side, an image is stored of the now un-obscured second layer, the fine positioning system restores the first layer to its original position, and then the clean stored image of the second layer is used to determine alignment state instead of an obscured image of the second layer. Depending on the segmentation algorithm used to identify the alignment marker, this process can been useful even in the event of minor occlusions, because some segmentation and location algorithms might be highly sensitive to such occlusions. These methods are readily applicable in the case of K>2 layers as well, in which case layers 1, 2, . . . , i−1, i+1, . . . , K are all temporarily moved to the side while an image of the i$^{th}$ layer is acquired and stored. This method has also been found particularly useful and efficient in contexts where the layers are separated by a distance greater than a depth of field of the imaging system, as multiple issues can be resolved with a common set of stored images. Several embodiments herein are advantageously applied in the context of layers having alignment markers such as those of the material layers 302–306.

FIG. 5A illustrates examples of layers 502, 504, and 506 having surface textures. The layers 502–504 are devoid of any alignment markers, whereas the "corner" feature in layer 506 may, or may not, constitute an alignment marker depending on how unique and/or identifiable it is. However, regardless of whether layer 506 represents an alignment marker, several other embodiments herein are advantageously applied in sensing relative position shifts of material layers between initial and subsequent configurations even where alignment markers are not present, provided only that there is some type of surface texture present.

In nanoimprint lithography environments, for example, it may be desirable to place a first and second layer in an initial alignment state not necessarily dictated by alignment markers, while also (i) maintaining that initial alignment state, or (ii) sensing changes in that initial alignment state, or (iii) altering that alignment state as process requirements dictate, or (iv) doing any other activity that may require sensing of relative position shifts between the first and second layers. It has been found beneficial to use image displacement sensing algorithms on a layer-by-layer basis, comparing an image of each layer in the subsequent configuration to an image of that same layer in the initial configuration to determine a position shift vector, and then performing vector subtraction on the position shift vectors for different layers to determine the relative position shifts between layers. Alignment marks are not needed in this embodiment, although there should be enough surface texture on each layer to allow operation of such image displacement sensing algorithms, and although the surface texture of any particular layer should not be obscured by other layers. The required surface texture can be provided either by native material patterns or by applied surface patterns, including alignment markers themselves. In the event a first layer does obscure a surface texture of a second layer, it has been found useful to obviate this occlusion using a fine positioning system, by temporarily moving the first layer to the side, store an image of the now un-obscured second layer, restoring the first layer to its original position, and then processing the clean stored version of the second layer according to the image displacement sensing algorithm. These methods are readily applicable in the case of K>2 layers as well, in which case layers 1, 2, . . . , i−1, i+1, . . . , K are all temporarily moved to the side while an image of the i$^{th}$ layer is acquired and stored. These methods have also been found particularly useful and efficient in contexts where the layers are separated by a distance greater than a depth of field of the imaging system, as multiple issues can be resolved with a common set of stored images.

Image displacement sensing algorithm refers to a class of processing algorithms in which a first matrix $M_t(x,y)$ and a second matrix $M_{t+\Delta t}(x,y)$ are processed to compute a displacement vector $\Delta M$ therebetween under a rigid body assumption, i.e., under an assumption that features or textures of the underlying item do not change over the interval $\Delta t$. In one embodiment, image displacement sensing algorithm refers to a subclass of image flow algorithms specially adapted for fast computation under the rigid body assumption. In another embodiment, image displacement sensing algorithm refers to a subclass of image flow algorithms specially adapted for detection of rigid-body displacements to sub-pixel resolutions. In still another embodiment, image displacement sensing algorithm refers to a subclass of image flow algorithms specially adapted to achieve both fast computation and sub-pixel resolution under the rigid body assumption.

In accordance with an embodiment, it has been found that one particularly useful image displacement algorithm cross-correlates the first and second matrices to produce a cross-correlation function, and then locates a global extremum of the cross-correlation function. Preferably, the cross-correlating further comprises estimating a continuous correlation surface at sub-pixel locations. A comparison function is computed comprising, for a predetermined number N of relative offset locations (N=9, 25, for example), a sum of squared differences, or other comparison metric, between the elements of the first and second matrices. A cost function is minimized between the comparison function and an estimated continuous correlation surface, wherein the estimated continuous correlation surface is a fitting function whose parameters are varied to minimize the cost function. In one embodiment, the fitting function is equivalent to a truncated Taylor series, although the scope of the present teachings is not so limited. In one embodiment in which the number of offset locations N is 9, the fitting function has six parameters, although the scope of the present teachings is not so limited. A global extremum of the estimated continuous correlation surface is located to determine the displacement, whereby the displacement can be determined to a sub-pixel resolution. Discussions of comparable methods used for optically-acquired images can be found in U.S. Pat. Nos. 5,149,180 and 6,195,475. In accordance with another embodiment, it has been found that another particularly useful image displacement algorithm computes phase differences between frequency domain representations of the first and second matrices, and determines image displacement based on the computed phase differences.

FIGS. 5B and 5C illustrate examples of moving a layer out of a field of view of an imaging system. In FIG. 5B, initially an upper layer 552 at least partially obscures a lower layer 554 relative to an imaging system 106, and then that layer is moved to a position out of the field of view of the imaging system 106. In this case, the upper layer 552 is moved until an air void therein lies above the lower layer 554 with respect to the imaging system. In FIG. 5C, initially an upper layer 562 at least partially obscures a lower layer 564 relative to the imaging system 106, and then that layer is moved to a position out of the field of view of the imaging system 106. In this case, the upper layer 562 is moved until a transparent patch 566 of material therein lies above the lower layer 564 with respect to the imaging system. For simplicity and clarity of presentation, multiple examples are presented herein in which, to move a layer to a position out of the field of view of an imaging system, that layer is translated until an outer periphery of the layer lies outside the horizontal boundaries of a vertical imaging column. However, as illustrated in FIGS. 5B and 5C, it is not required that an outer periphery of the layer lie outside a horizontal boundary of a vertical imaging column for that layer to be out of a field of view of an imaging system as that term is used herein. Rather, by out of the field of view, it is meant that the layer is in a position such that no obstructing features are in the way of allowing a clean image of a different layer to be acquired by the imaging system.

Figure 6:
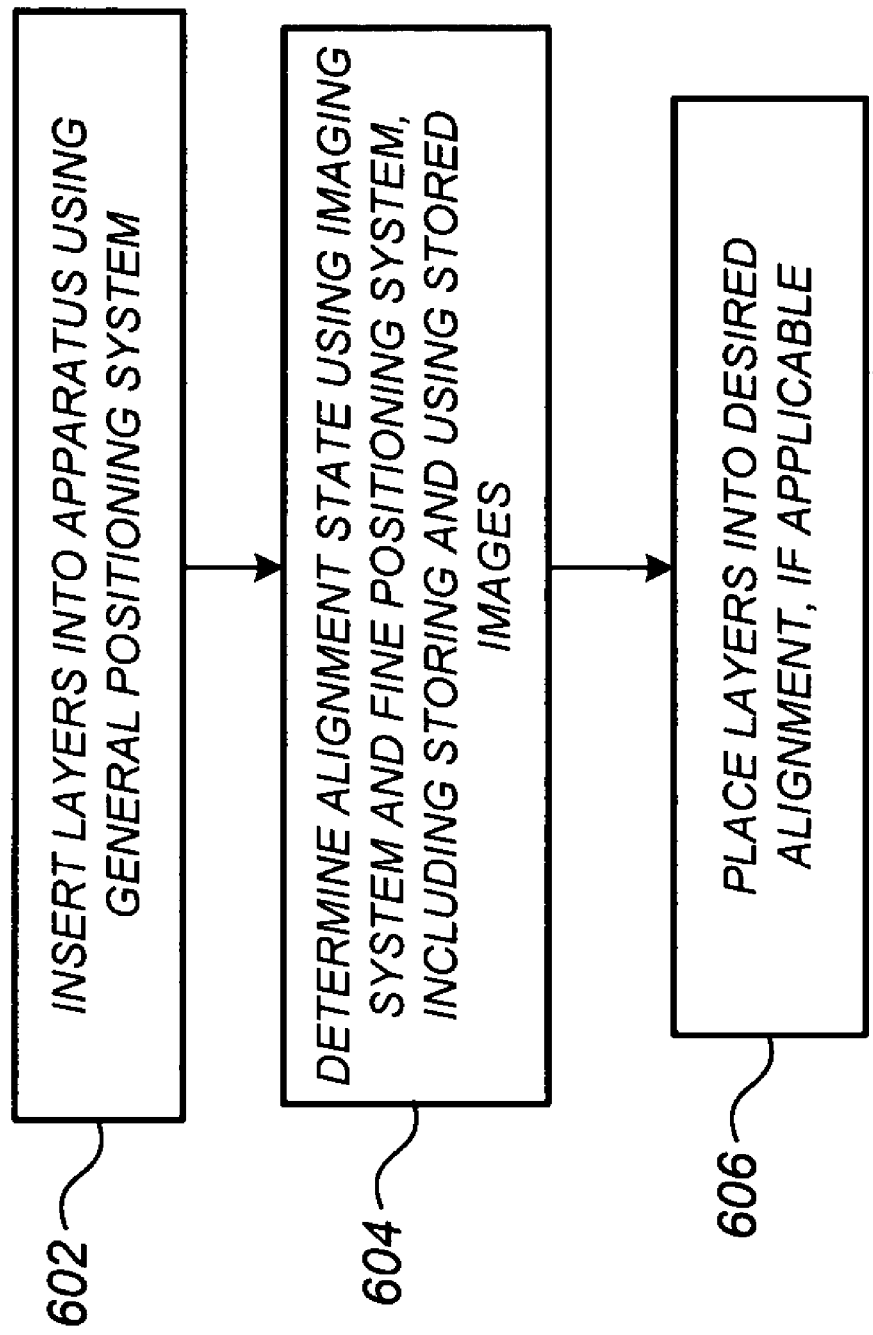
FIGS. 6–11 illustrate determining alignment states according to one or more embodiments.

FIG. 6 illustrates alignment state sensing according to an embodiment. At step 602, the layers are inserted into the apparatus 100 using the general positioning system 116. At step 604, the alignment state is determined using the imaging system 106, processor 112, memory 114, and fine positioning system 108. Generally speaking, step 604 is detailed further in relation to FIGS. 7–11. At step 606, the layers can be placed into a desired alignment state by the fine positioning system 108, if applicable.

Figure 7:
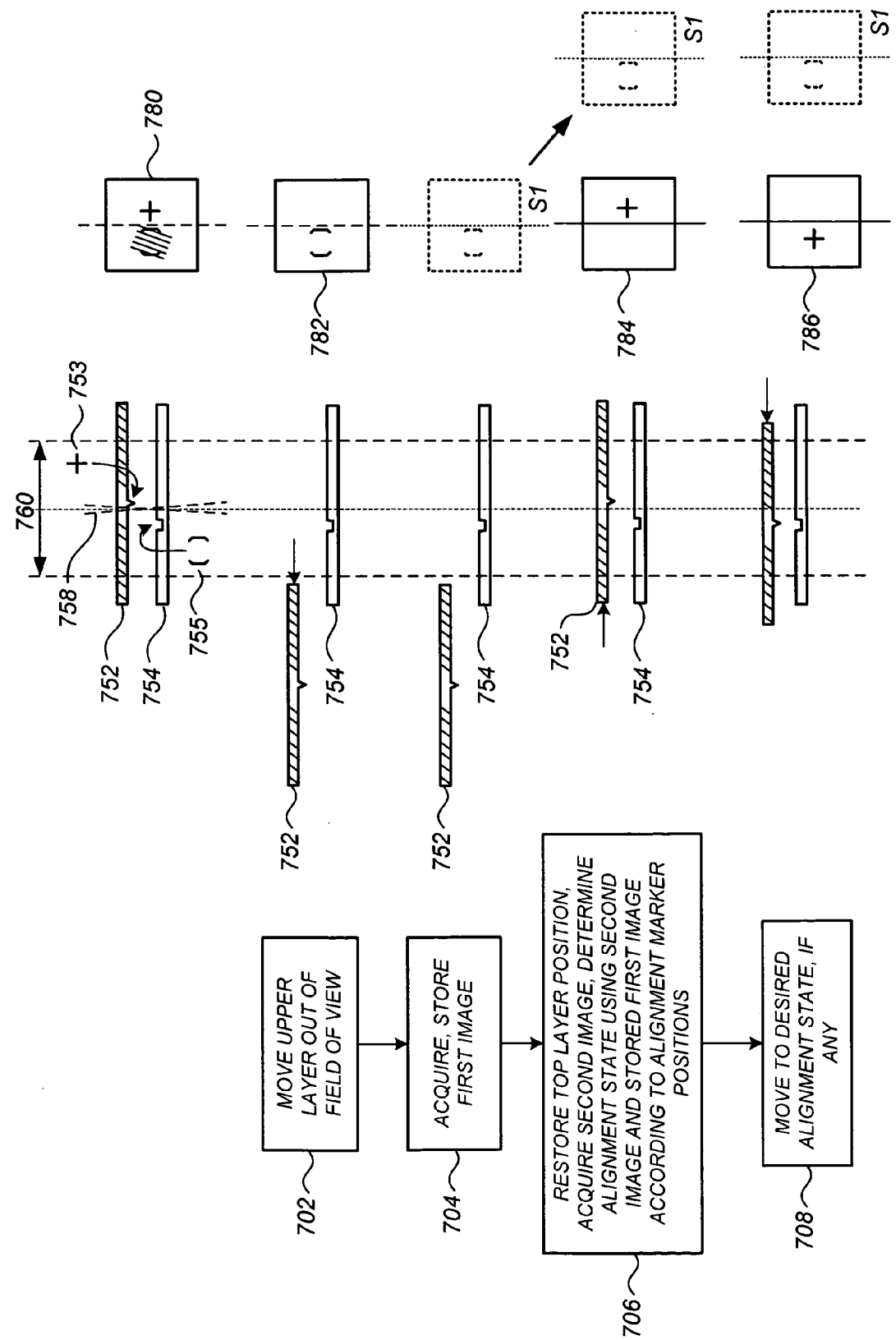

FIG. 7 illustrates alignment state sensing according to an embodiment. For clarity, each of FIGS. 7–11 and FIGS. 12–16 illustrate (i) method steps on the left-hand side, (ii) a simplified, one-dimensional layer positioning representation in the middle, and (iii) corresponding image frames, if any, on the right-hand side. Generally speaking, a dotted-line image frame refers to a stored image, while a solid-line image frame refers to a "live" image that would be seen with the layers in their current state. As illustrated herein, sometimes the "live" images are usable, while other times they are not usable, according to the described methods.

FIG. 7 illustrates an upper layer 752 having an alignment marker 753 and a lower layer 754 having an alignment marker 755 in an initial alignment state within a field of view 760 of an imaging system having a depth of focus greater than the layer separation, as indicated by a narrow hypothetical cone beam 758. The upper layer 752 at least partially obscures the alignment marker 755 of the lower layer 754, as indicated by the hash marks over the lower layer alignment marker in the frame 780. At step 702, the upper layer 752 is moved out of the field of view 760. At step 704, a first image comprising at least a portion of the lower layer 754 including the alignment marker 755 is acquired and stored (S1). At step 706, the upper layer 752 is precision-restored to its initial position by the fine positioning system 108, and the initial alignment state is determined using the first stored image S1 and a second image 784, the second image 784 including the alignment mark 753 of the upper layer 752. The initial alignment state can thereby be made directly using the positions of the alignment marks 753 and 755 relative to the imaging system, which serves as the frame of reference. Advantageously, this process is facilitated because the image S1 is now a clean image, without even a minor amount of obscuration from the upper layer 752. By way of example, this can make the choice of segmentation algorithm very simple, as even a simple Gaussian blur and thresholding can yield the locations of each alignment marker within the separate images S1 and 784. Optionally, at step 708, the layers can be moved to a desired alignment state.

Figure 8:
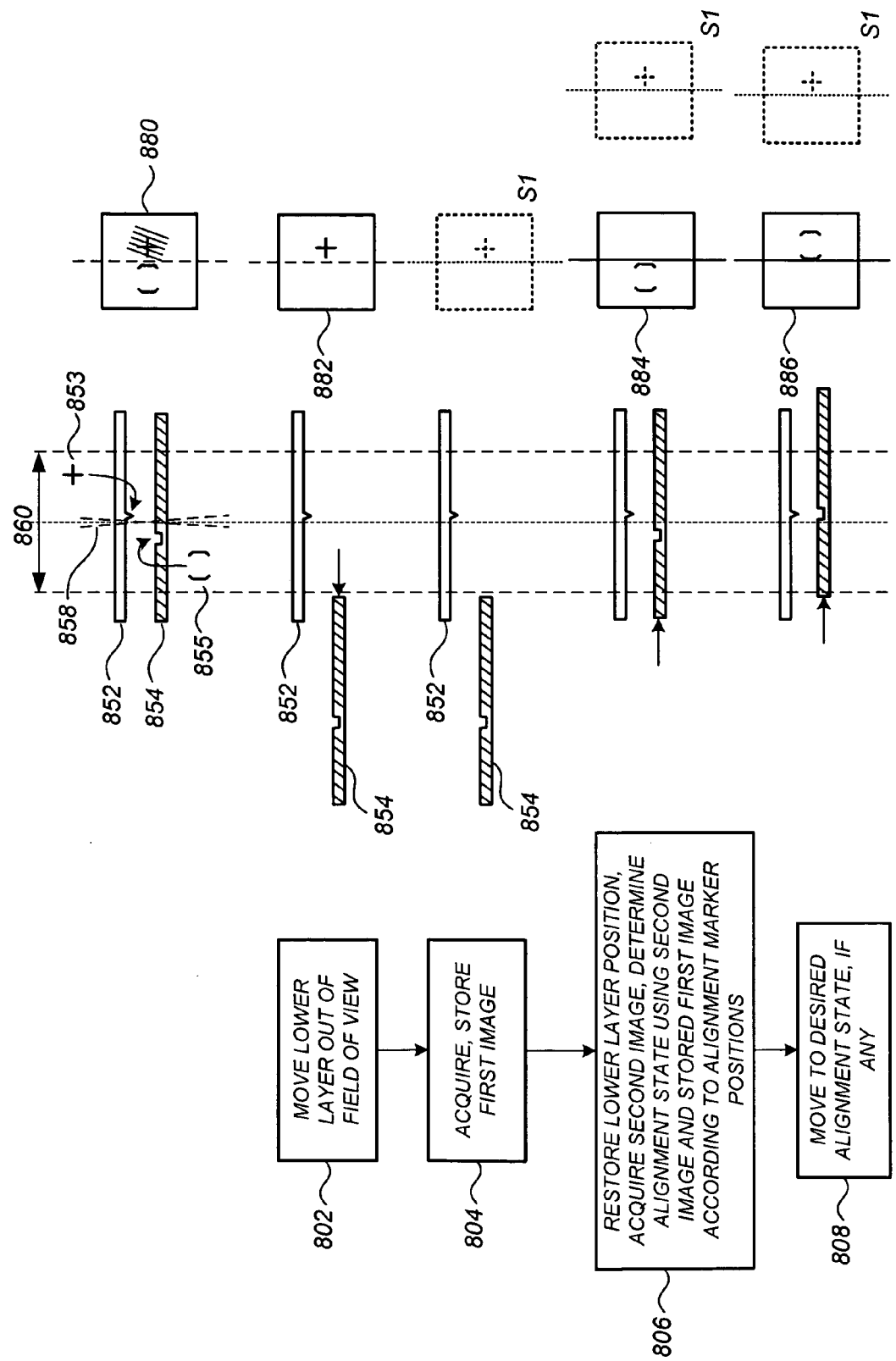

FIG. 8 illustrates alignment state sensing according to an embodiment. FIG. 8 illustrates an upper layer 852 having an alignment marker 853 and a lower layer 854 having an alignment marker 855 in an initial alignment state within a field of view 860 of an imaging system having a depth of focus greater than the layer separation, as indicated by a narrow hypothetical cone beam 858. In this example, it is the lower layer 854 that at least partially obscures the upper layer 852. At step 802, the lower layer 854 is moved out of the field of view 860. At step 804, a first image comprising at least a portion of the upper layer 852 including the alignment marker 853 is acquired and stored (S1). At step 806, the lower layer 854 is precision-restored to its initial position by the fine positioning system 108, and the initial alignment state is determined according to alignment marker positions using the first stored image S1 and a second image 884, the second image comprising the alignment mark 855 of the lower layer 854. In still another embodiment, where both layers at least partially obscure each other, analogous steps to a combination of FIGS. 7 and 8 are performed, with each layer being set aside as an image of the other layer is acquired and stored.

Figures 1, 9:
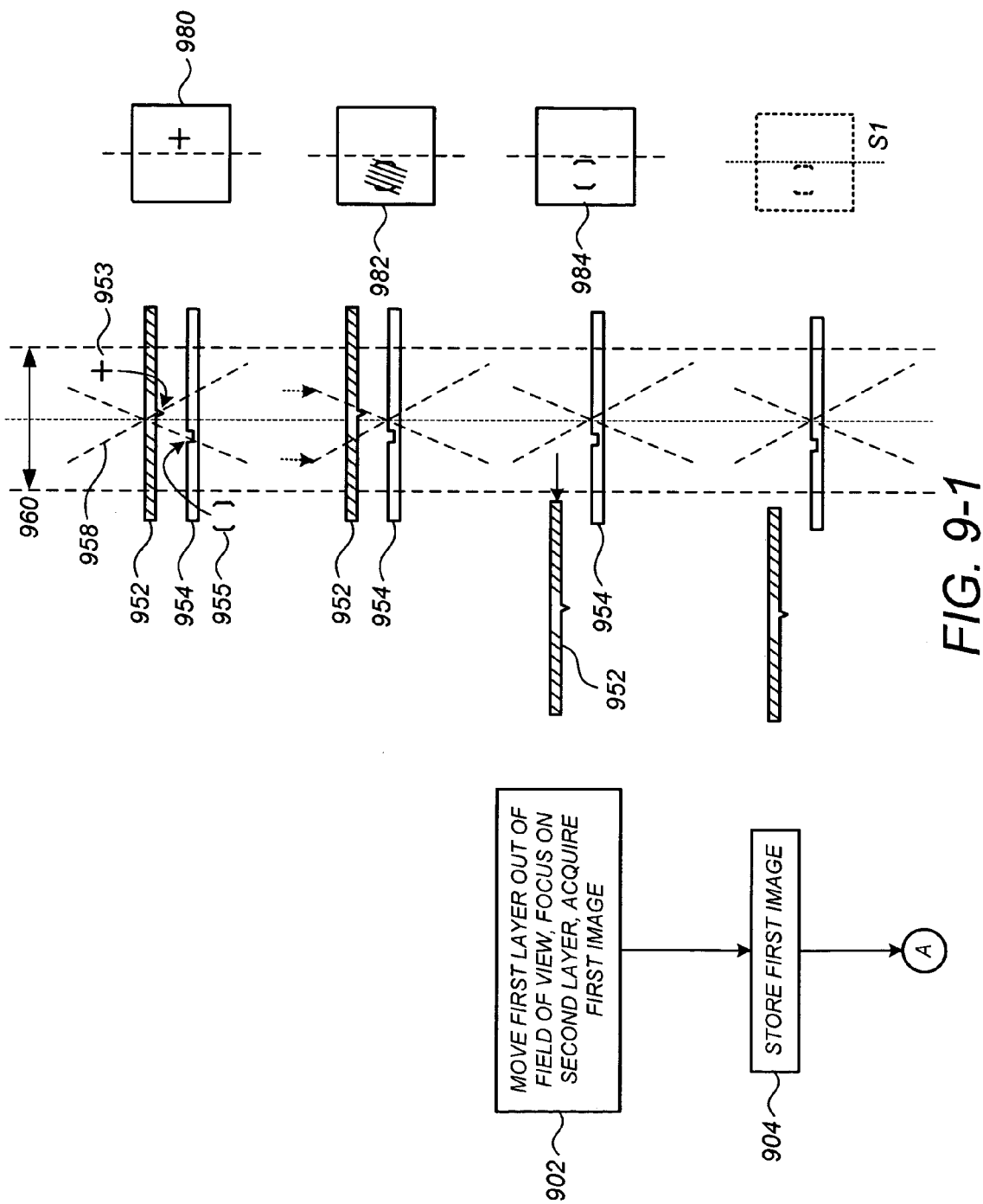
Figures 2, 9:
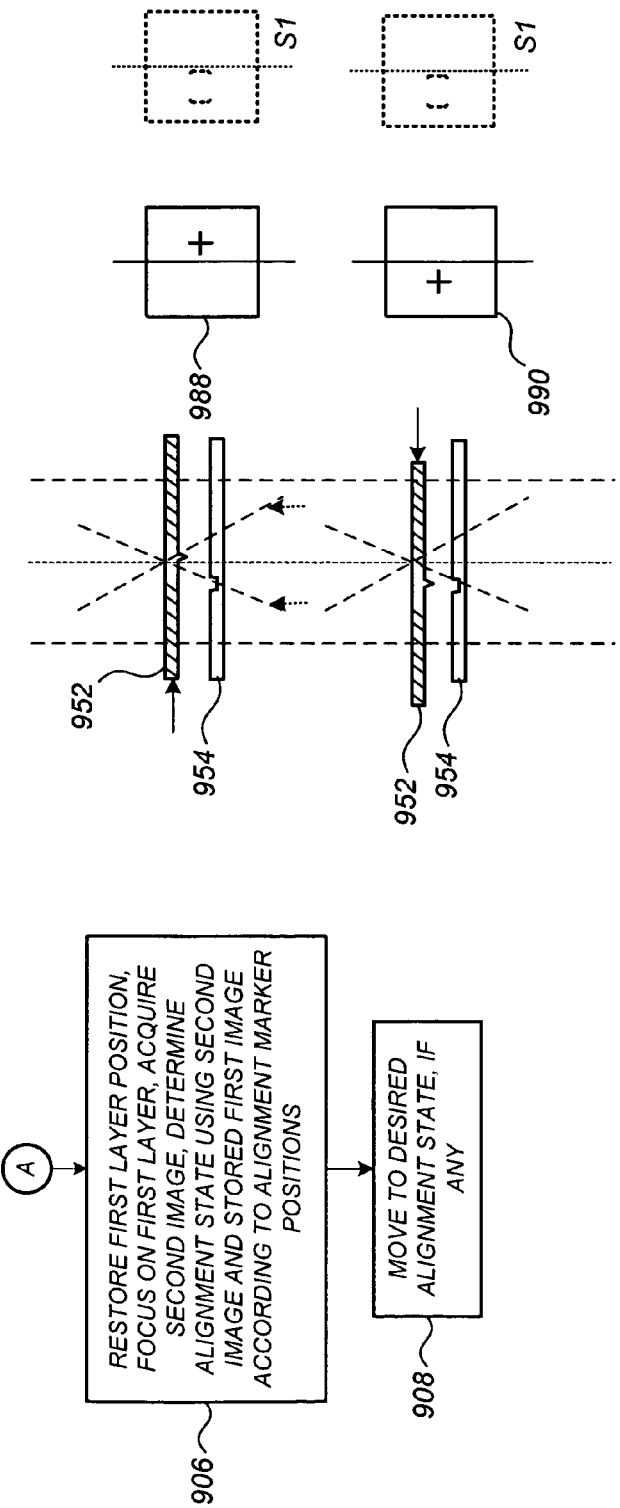

FIG. 9 illustrates alignment state sensing according to an embodiment. FIG. 9 illustrates a first layer 952 having an alignment marker 953 and a second layer 954 having an alignment marker 955 in an initial alignment state within a field of view 960 of an imaging system having a depth of focus less than the layer separation, as indicated by a wide hypothetical cone beam 958. In this example, the first layer 952 at least partially obscures the second layer 954 even though they lie in disparate focal zones, as illustrated by frame 982. At step 902, the first layer 952 is moved out of the field of view 960, the imaging system focuses on the second layer 954, and acquires an image 984 thereof. At step 904, the first image is stored (S1). At step 906 the first layer 952 is precision-restored to its initial position by the fine positioning system 108, the focal plane is moved upward to the first layer 952, and the initial alignment state is determined according to alignment marker positions using the first stored image S1 and a second image 988 comprising the alignment mark 953 of the first layer 952, according to alignment marker positions. In another embodiment, the first layer 952 lies underneath the second layer 954 relative to the imaging system, and analogous steps are performed. In still another embodiment, where both layers at least partially obscure each other, analogous steps are performed except that each layer is set aside as an image of the other layer is acquired and stored.

In the event the top layer is completely opaque, and in the event the interesting surface of the top layer faces downward relative to the imaging system, one effective way of resolving alignment issues in the context of a single-camera alignment scheme is to implement an alignment marker that goes all the way through that layer in a through-hole manner. In this way, the need for copying any underside surface pattern to the top surface, which can be unreliable and introduce errors in its own right, is avoided.

Figures 1, 10:
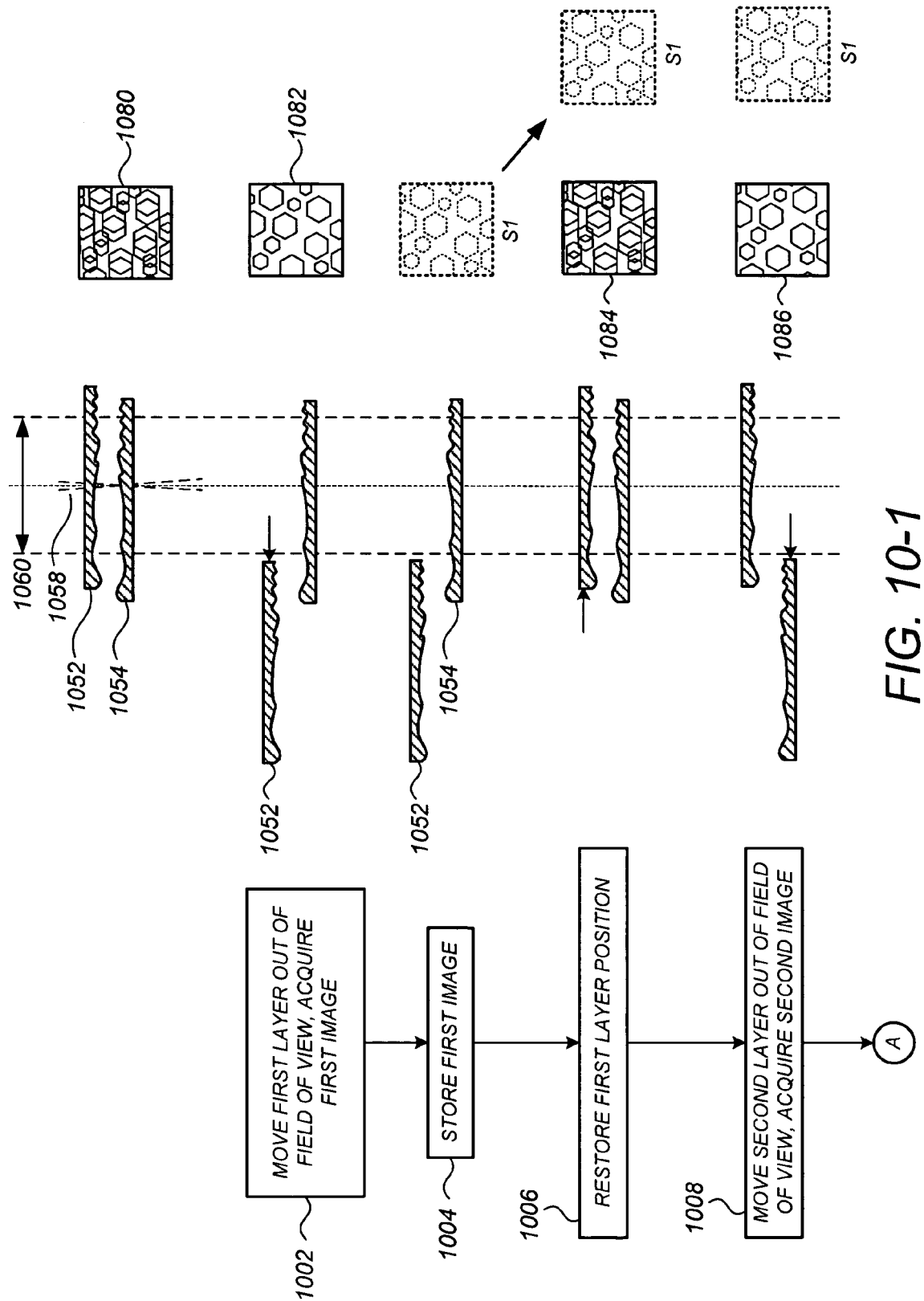
Figures 2, 10:
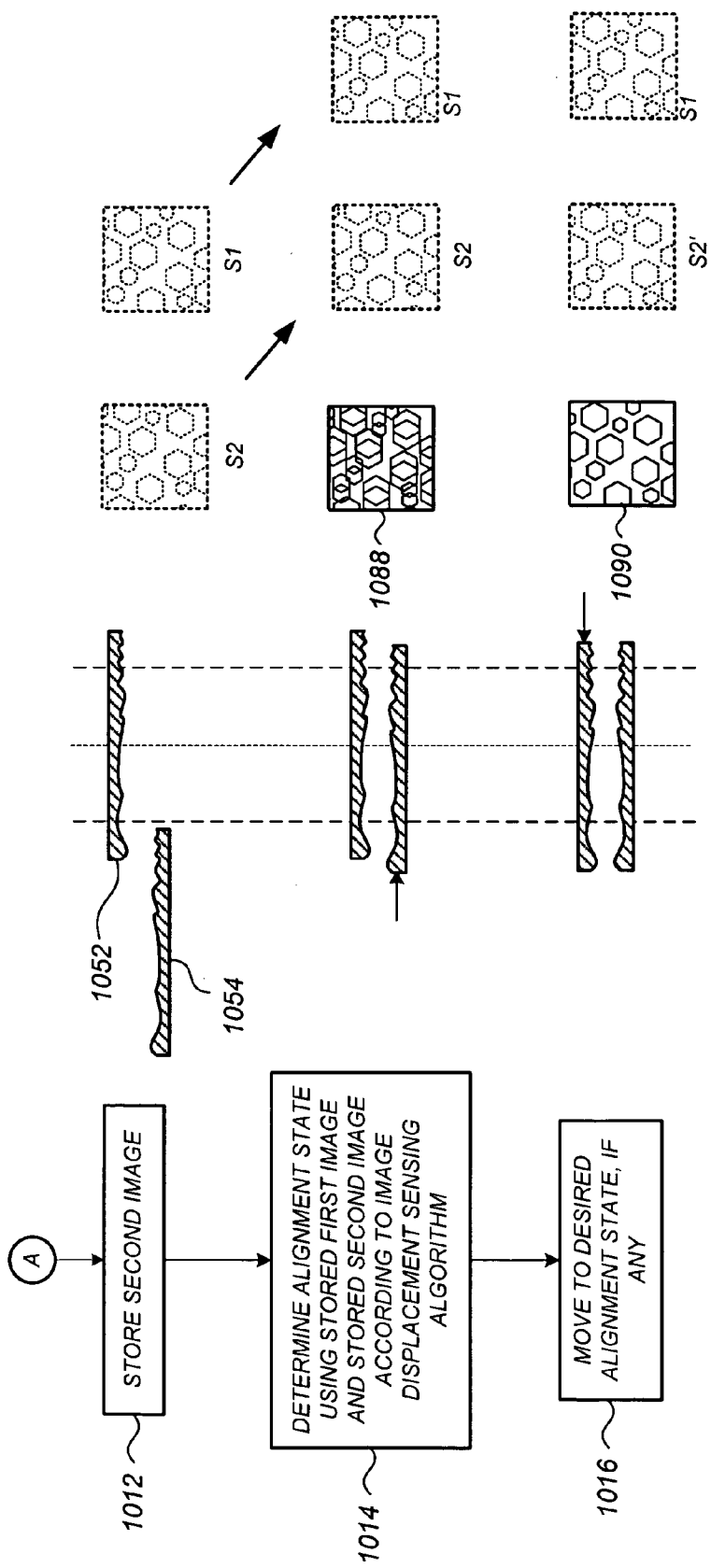

FIG. 10 illustrates alignment state sensing according to an embodiment. FIG. 10 illustrates a first layer 1052 and a second layer 1054 in an initial alignment state within a field of view 1060 of an imaging system having a depth of focus greater than the layer separation, as indicated by a narrow hypothetical cone beam 1058. In this example, it is assumed the layers 1052 and 1054 are substantially identical as viewed by the imaging system, and that the layers 1052 and 1054 at least partially obscure each other. At step 1002, the first layer 1052 is moved out of the field of view 1060, and the imaging system acquires a first image 1082 of the second layer 1054. At step 1004, the first image is stored (S1). At step 1006 the first layer 1052 is restored to its initial position by the fine positioning system 108. At step 1008 the second layer 1054 is moved out of the field of view 1060, and the imaging system acquires a second image 1086 of the first layer 1052. At step 1012 the second image is stored (S2). At step 1014 the initial alignment state is determined by processing the first stored image S1 and the second stored image S2 according to an image displacement sensing algorithm, supra, in terms of a relative offset therebetween. This is achievable since the layers are substantially identical. If applicable, at step 1014 the layers are moved to a desired relative alignment state.

Figures 1, 11:
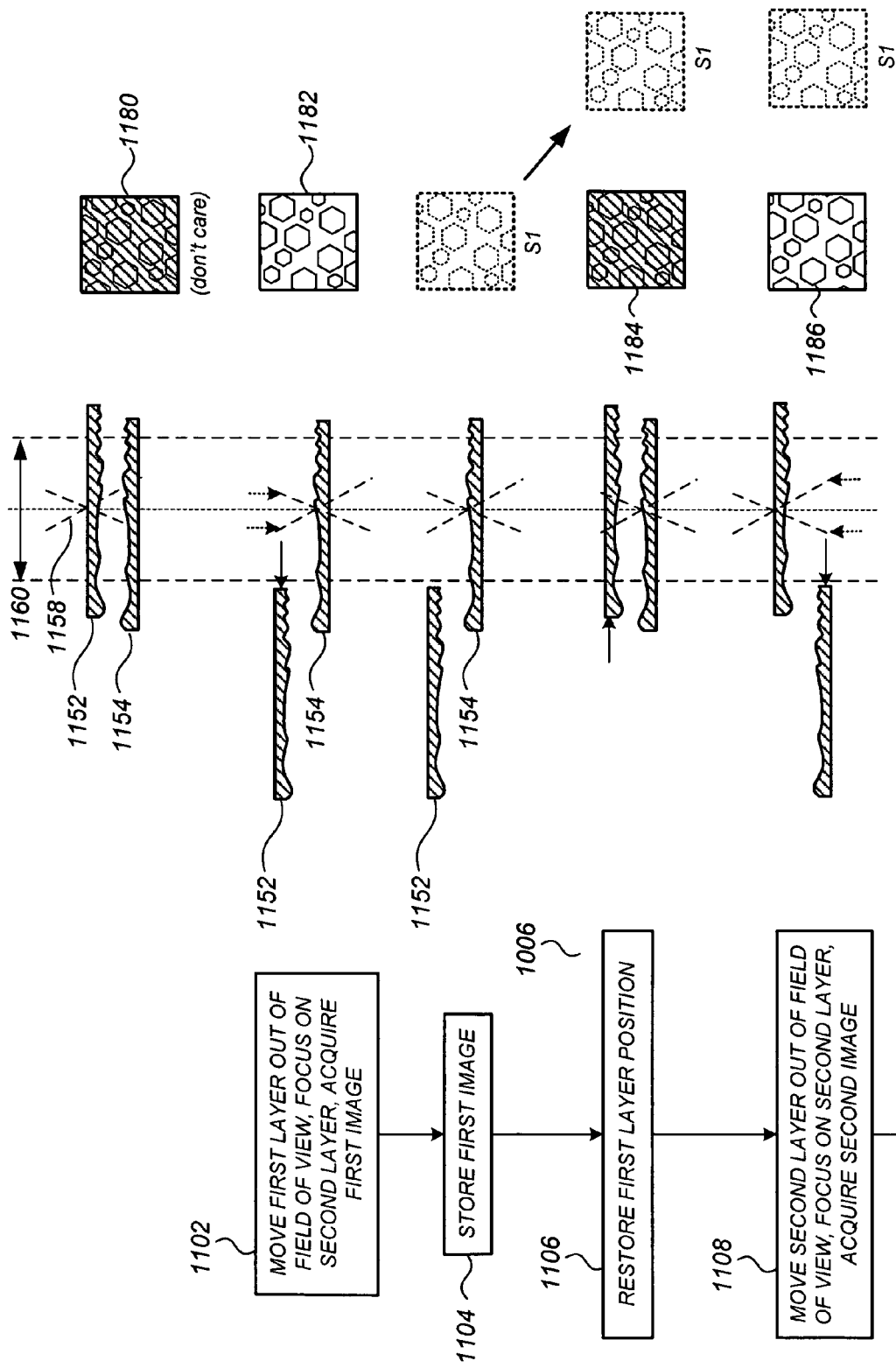
Figures 2, 11:
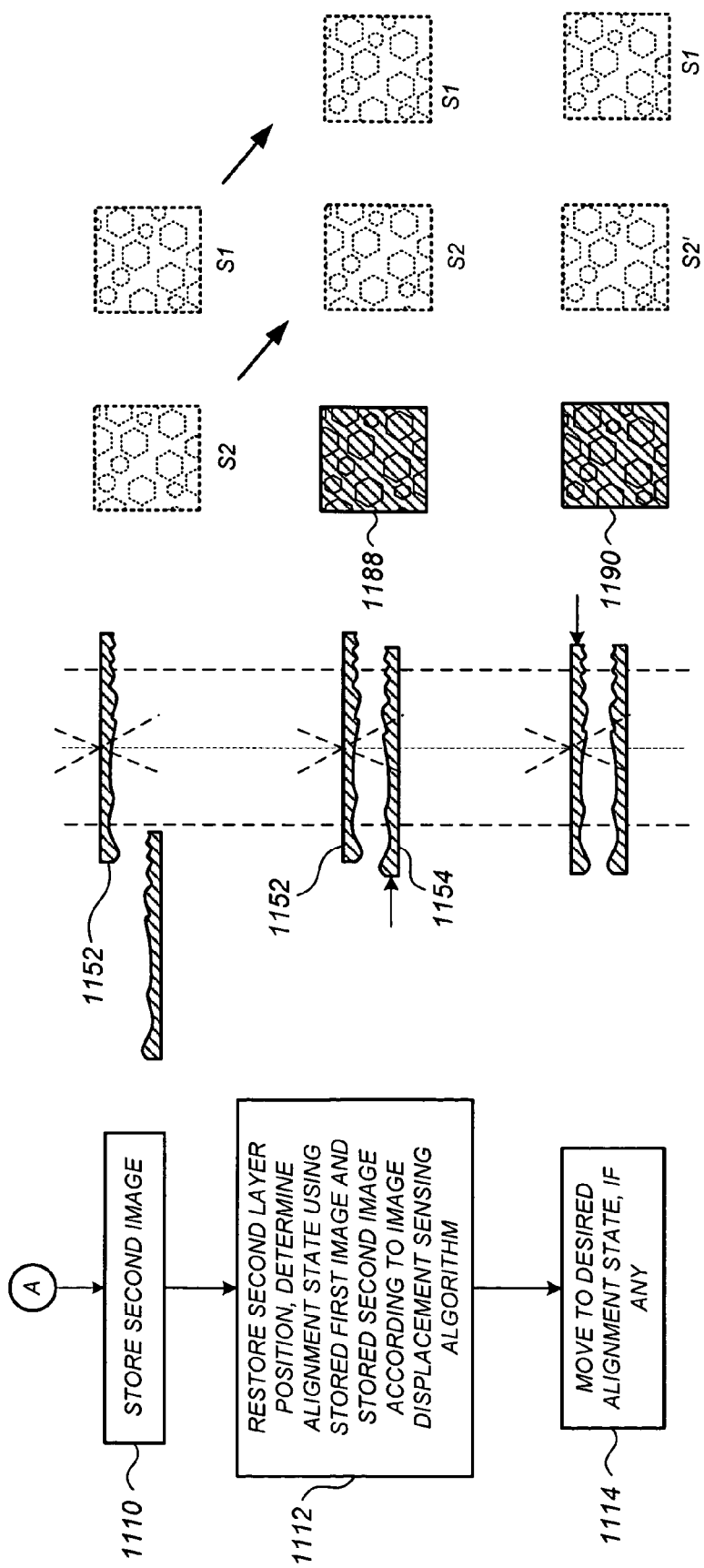

FIG. 11 illustrates alignment state sensing according to an embodiment. FIG. 11 illustrates a first layer 1152 and a second layer 1154 in an initial alignment state within a field of view 1160 of an imaging system having a depth of focus less than the layer separation, as indicated by a wide hypothetical cone beam 1158. As with the example of FIG. 10, it is assumed the layers 1152 and 1154 are substantially identical as viewed by the imaging system, and that the layers 1152 and 1154 at least partially obscure each other even though they are in different focal zones. At step 1102, the first layer 1152 is moved out of the field of view 1160, the imaging system focuses on the second layer 1154, and acquires a first image 1182 thereof. At step 1104, the first image is stored (S1). At step 1106 the first layer 1152 is restored to its initial position by the fine positioning system 108. At step 1108 the second layer 1154 is moved out of the field of view 1160, the imaging system focuses on the first layer 1152, and acquires a second image 1186 thereof. At step 1110 the second image is stored (S2). At step 1112 the initial alignment state is determined by processing the first stored image S1 and the second stored image S2 according to an image displacement sensing algorithm, supra. If applicable, at step 1114 the layers are moved to a desired relative alignment state. In another embodiment in which only one of the layers (upper or lower) at least partially obscures the other, only a subset of the steps of FIGS. 10 and 11 are required, i.e. it is not required that the non-obscuring layer be moved aside while the image of the obscuring layer is acquired.

Figure 12:
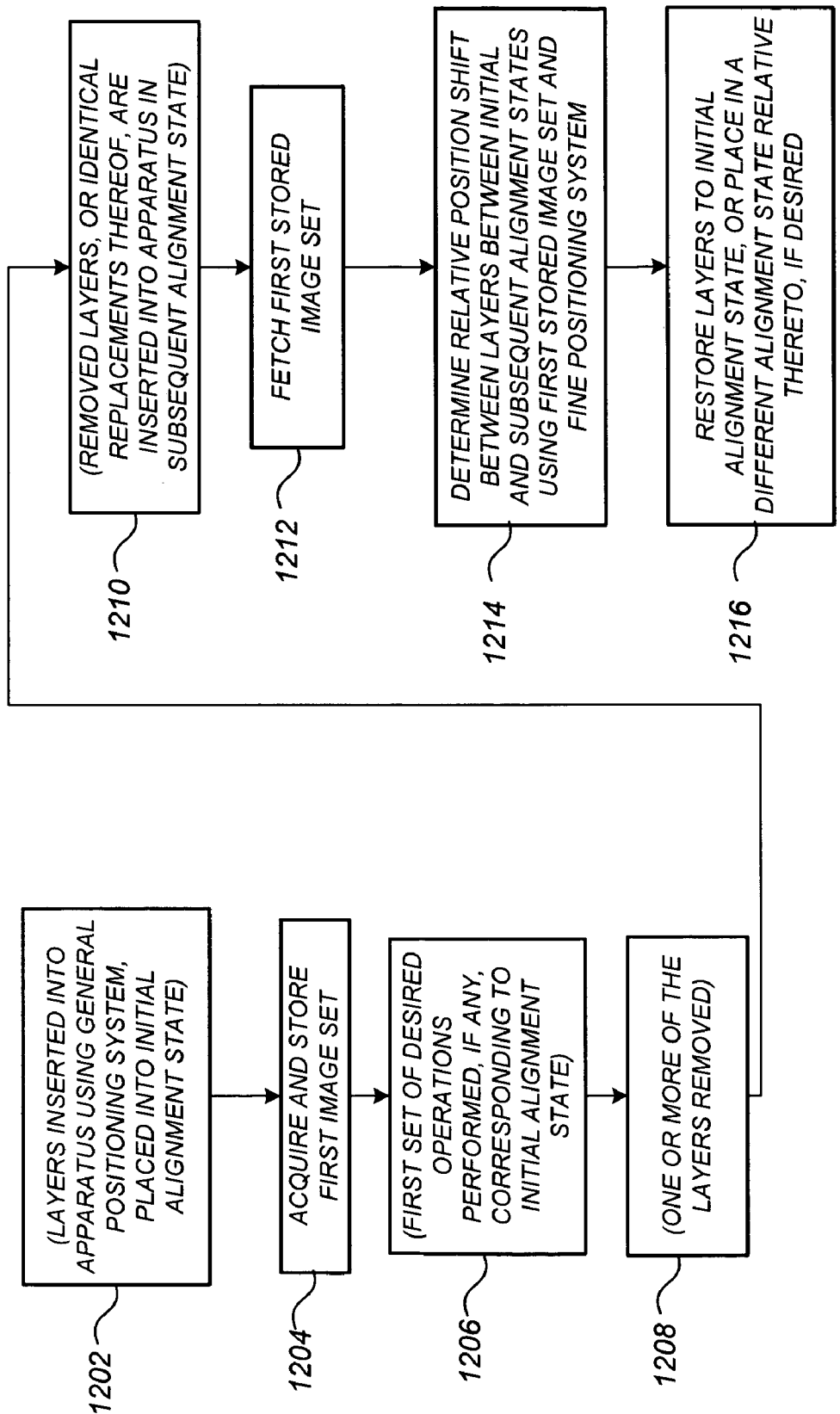
FIGS. 12–16 illustrate determining relative layer position shifts according to one or more embodiments.

FIG. 12 illustrates determining a relative position shift between material layers according to an embodiment. Several of the items presented in FIG. 12 are optional and/or lie outside the relative position shift detection process, but are presented to provide context therefor. At step 1202, the layers are inserted into the apparatus 100 using the general positioning system 116 and take on an initial alignment state or configuration. At step 1204, a first image set is acquired corresponding to the initial alignment state. Aspects of steps 1204 and 1214 are detailed further infra with respect to FIGS. 13–16. At step 1206, some set of operations, if desired, is performed. At step 1208, one or more of the layers can be entirely removed, and then at step 1210 the removed layers, or substantially identical replacement versions thereof, can be reinserted into a subsequent alignment state or configuration. At step 1212 the first stored image set is retrieved from memory. At step 1214, the relative position shift between layers between the initial and subsequent configurations is determined using the first stored image set and the fine positioning system, as detailed further infra with respect to FIGS. 13–16. At step 1216, knowledge of the relative position shift can be advantageously harnessed in a variety of ways, such as for restoring the initial alignment state, placing into a desired alignment state relative to the initial/subsequent alignment states, etc.

Figure 13:
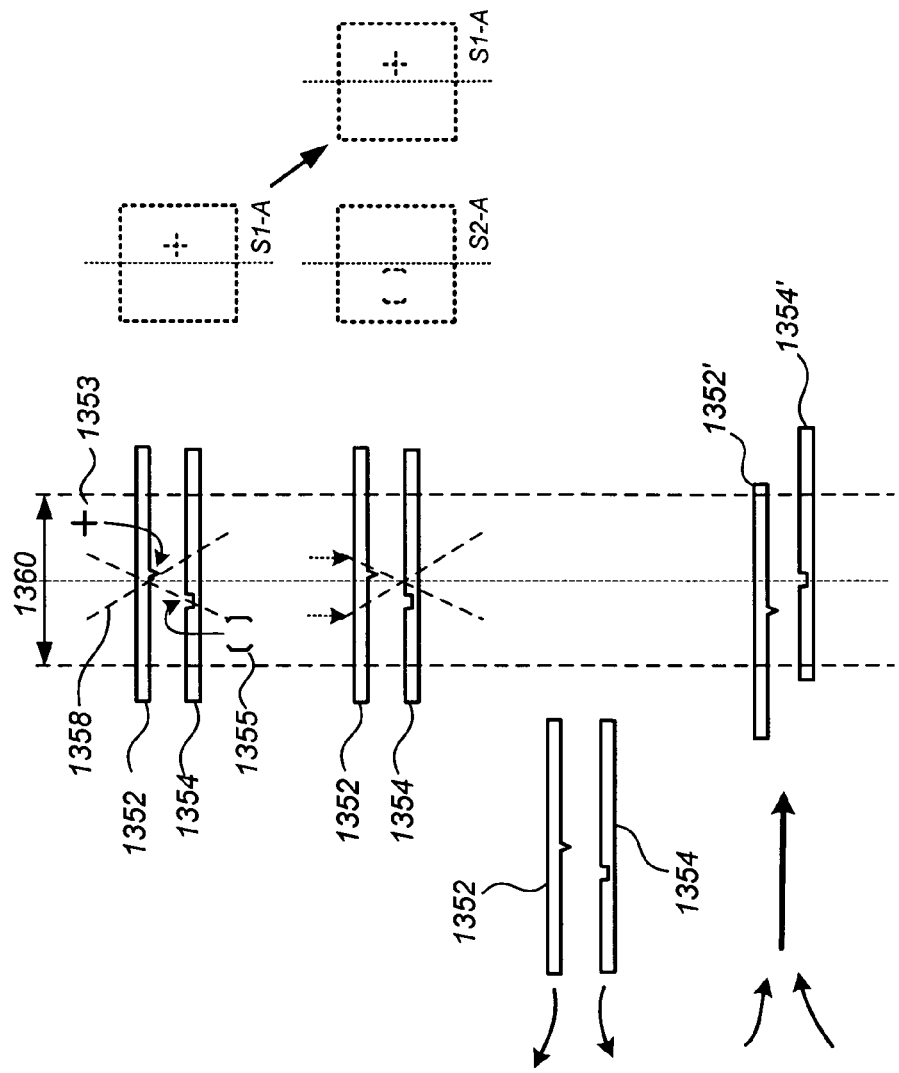
Figure 1:
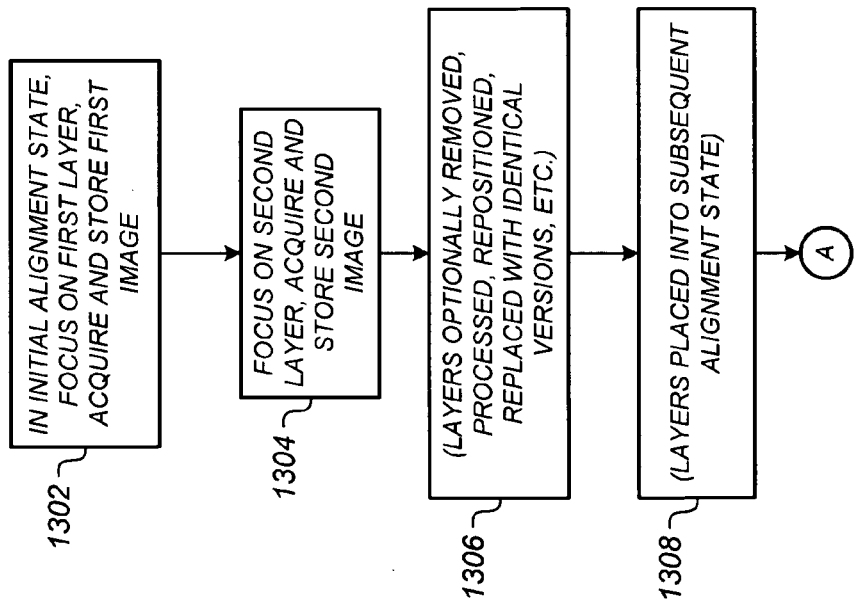
Figure 13:
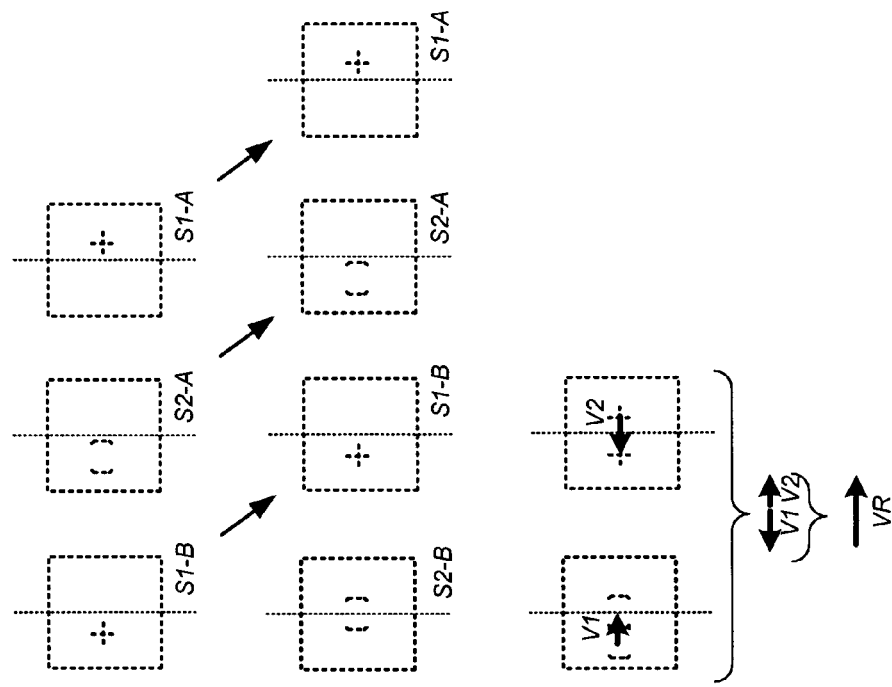
Figure 2:
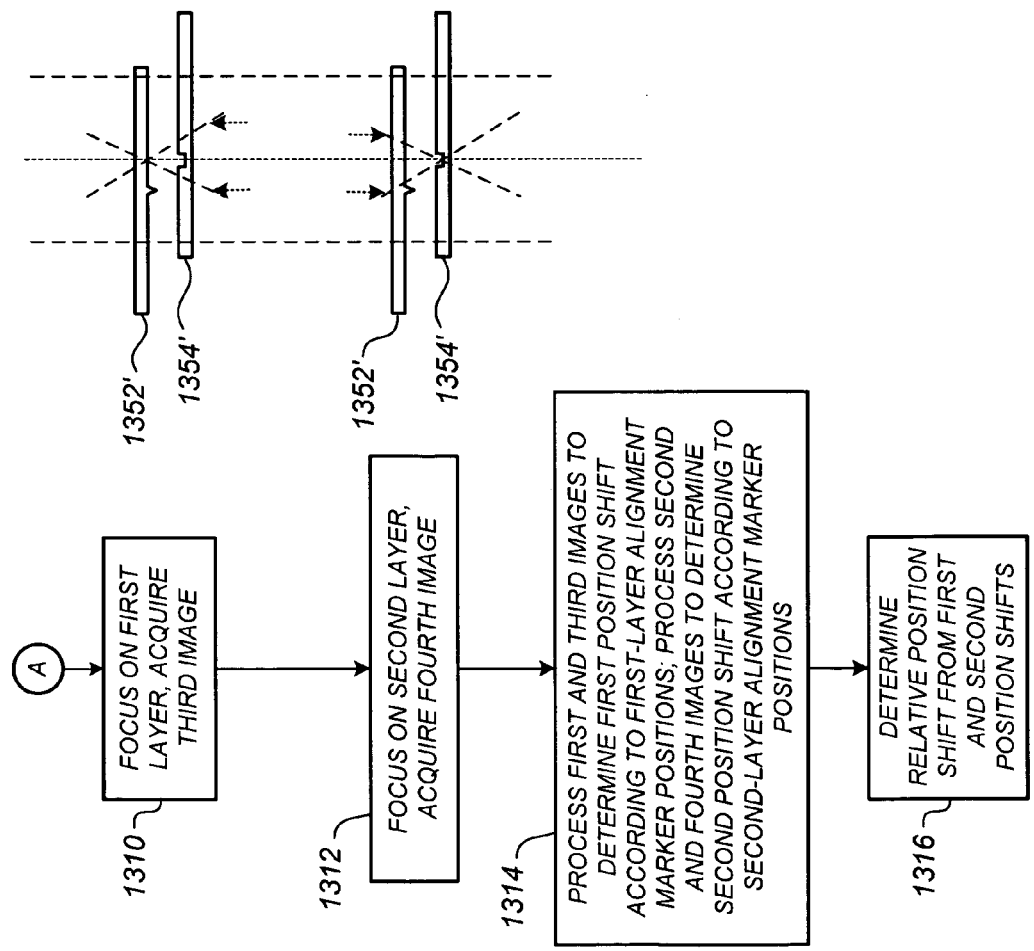

FIG. 13 illustrates determining a relative position shift between material layers according to an embodiment. FIG. 13 illustrates a first layer 1352 having an alignment marker 1353 and a second layer 1354 having an alignment marker 1355 in an initial alignment state within a field of view 1360 of an imaging system having a depth of focus less than the layer separation, as indicated by a wide hypothetical cone beam 1358. At step 1302, in an initial alignment state, the imaging system focuses on the first layer 1352, and acquires and stores a first image S1-A. At step 1304, in the initial alignment state, the imaging system focuses on the second layer 1354, and acquires and stores a second image S2-A. As discussed previously with respect to FIG. 12, at this time intermediate processing can occur, as represented by steps 1306–1308, causing the layers to assume a subsequent configuration. Elements 1352' and 1354' are used to denote the first and second layers in the subsequent alignment state, as they may optionally be replaced by identical versions thereof during steps 1306–1308. At step 1310, in the subsequent alignment state, the imaging system focuses on the first layer 1352', and acquires and stores a third image S1-B. At step 1312, in the subsequent alignment state, the imaging system focuses on the second layer 1354, and acquires and stores a fourth image S2-B. At step 1314, the first and third images S1-A and S1-B are processed according to an image displacement sensing algorithm, supra, to determine a position shift vector V1 representing a change in the position of the first layer 1352/1352' between the initial and subsequent configurations. Also, the second and fourth images S2-A and S2-B are processed similarly to determine a position shift vector V2 representing a change in the position of the second layer 1354/1354' between the initial and subsequent configurations. At step 1316, a relative position shift vector VR is computed by vector subtraction of the position shift vectors V1 and V2.

Figures 1, 14:
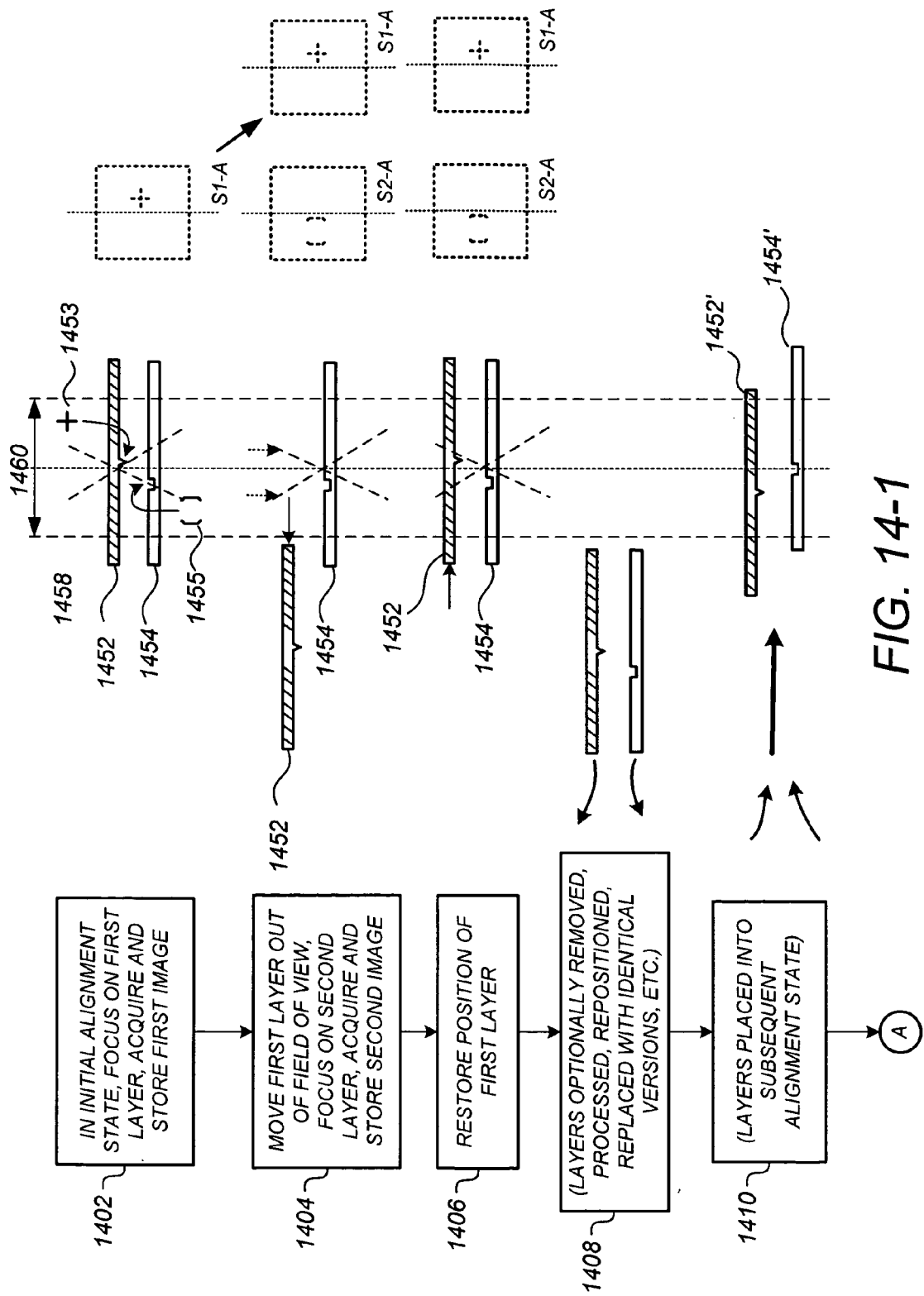
Figures 2, 14:
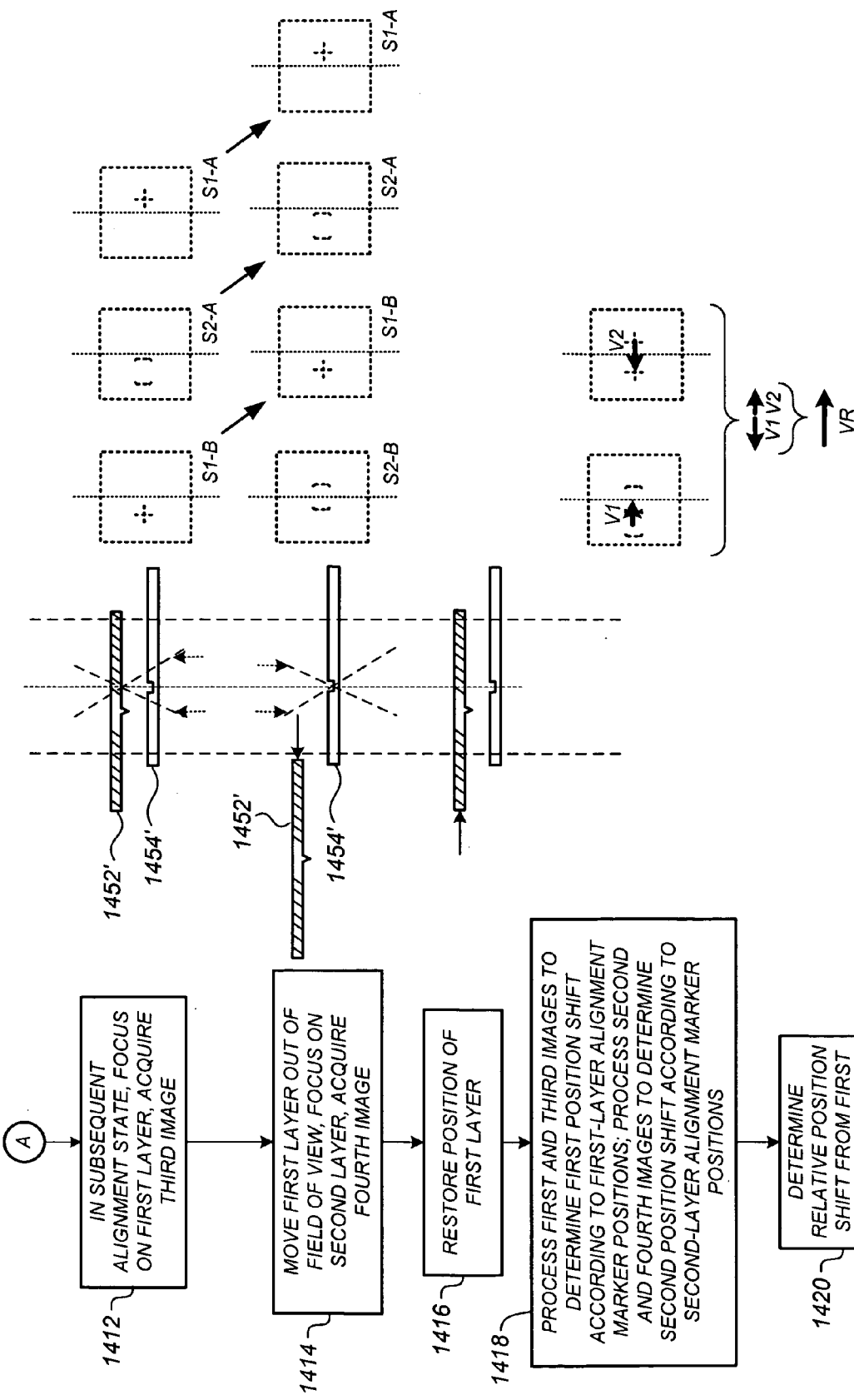

FIG. 14 illustrates determining a relative position shift between material layers according to an embodiment. FIG. 14 illustrates a first layer 1452 having an alignment marker 1453 and a second layer 1454 having an alignment marker 1455 in an initial alignment state within a field of view 1460 of an imaging system having a depth of focus less than the layer separation, as indicated by a wide hypothetical cone beam 1458. In this example, the first layer 1452 at least partially obscures the second layer 1454 even though they lie in disparate focal zones. At step 1402, in an initial alignment state, the imaging system focuses on the first layer 1452, and acquires and stores a first image S1-A. At step 1404, the first layer 1452 is moved out of the field of view 1460, the imaging system focuses on the second layer 1454, and acquires and stores a second image S2-A. At step 1406, the first layer 1452 is restored to its previous position. Intermediate processing/shuffling occurs at steps 1408–1410 similar to steps 1306–1308, supra. At step 1412, in the subsequent alignment state, the imaging system focuses on the first layer 1452', and acquires and stores a third image S1-B. At step 1414, the first layer 1452' is moved out of the field of view 1460, the imaging system focuses on the second layer 1454', and acquires and stores a fourth image S2-B. Steps 1418–1420 proceed in a manner similar to steps 1314–1316 of FIG. 13 for determining the relative position shift VR. As indicated by the examples of FIGS. 13–14, while the image displacement sensing algorithm is indeed effective when alignment markers are present, the alignment markers themselves are only "used" in the sense that they represent some type of surface texture for the layers. In another embodiment, the first layer 1452 lies underneath the second layer 1454 relative to the imaging system, and analogous steps are performed. In still another embodiment, where both layers at least partially obscure each other, analogous steps are performed except that each layer is set aside as the an image of the other layer is acquired and stored.

Figures 1, 15:
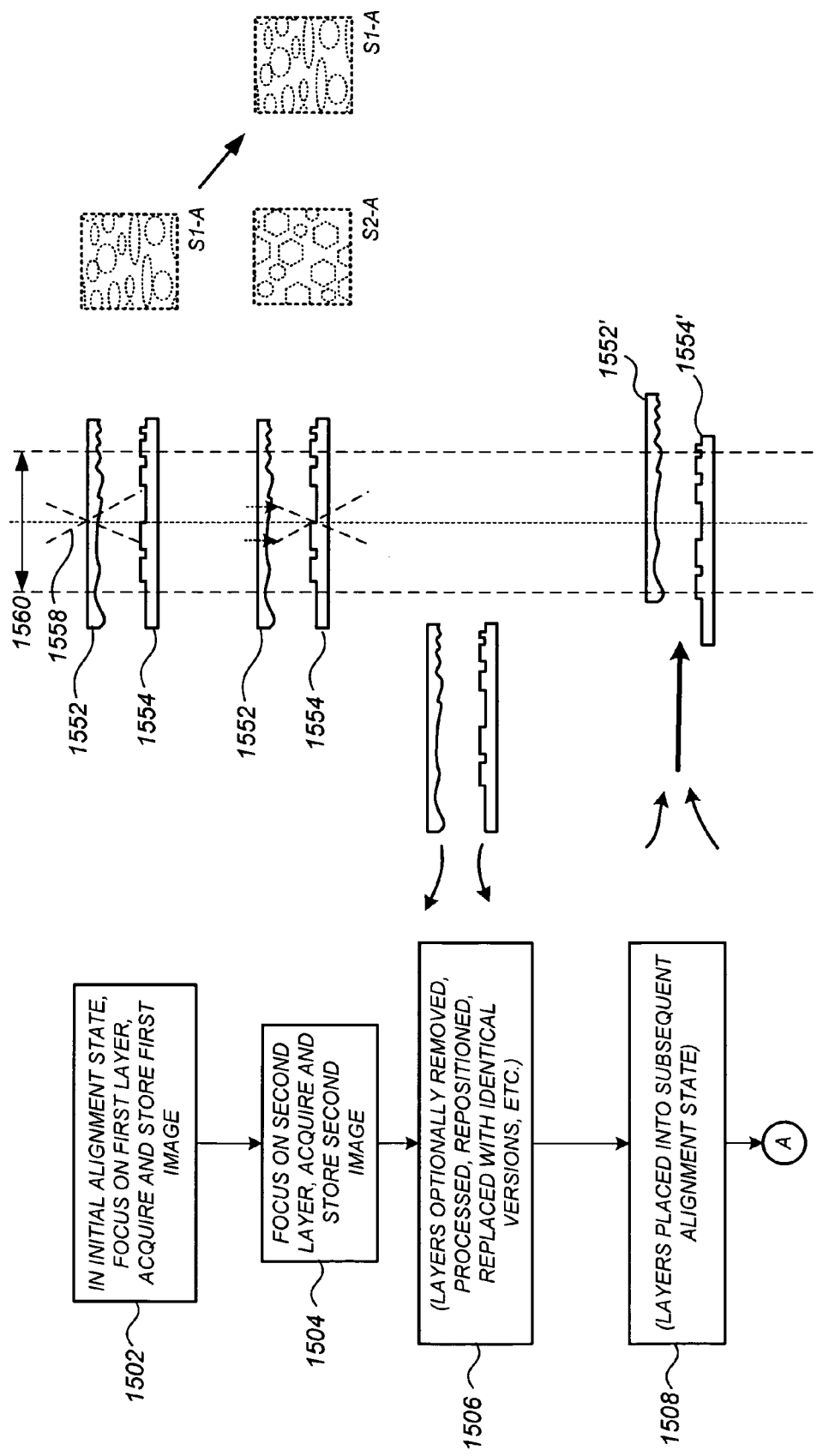
Figures 2, 15:
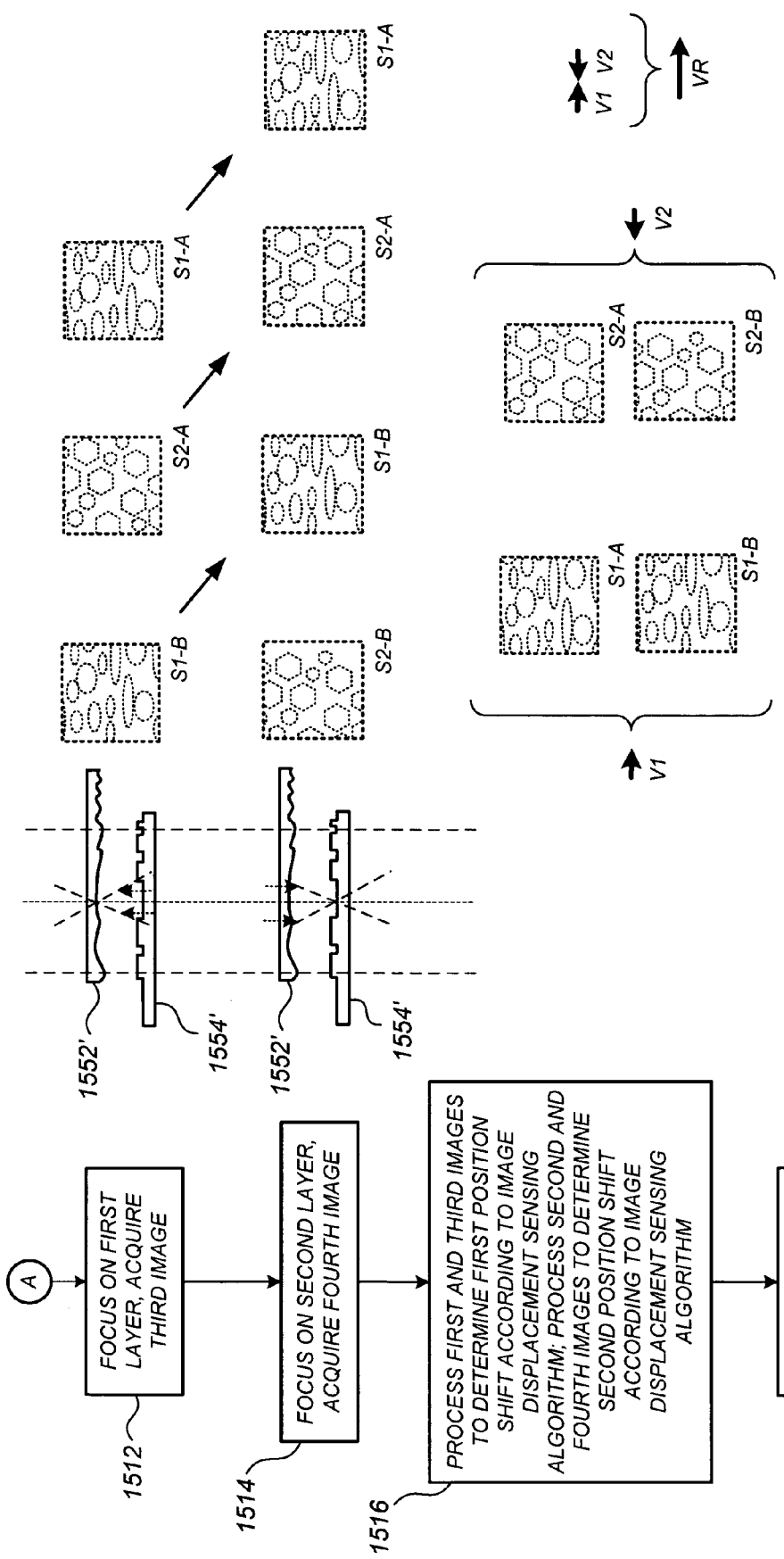

FIG. 15 illustrates determining a relative position shift between material layers according to an embodiment. FIG. 15 illustrates a first layer 1552 and a second layer 1554 in an initial alignment state within a field of view 1560 of an imaging system having a depth of focus less than the layer separation, as indicated by a wide hypothetical cone beam 1558. Here, the layers do not have alignment markers, but do possess surface textures sufficient for an image displacement sensing algorithm, supra. At step 1502, in an initial alignment state, the imaging system focuses on the first layer 1552, and acquires and stores a first image S1-A. At step 1504, in the initial alignment state, the imaging system focuses on the second layer 1554, and acquires and stores a second image S2-A. Intermediate processing/shuffling occurs at steps 1506–1508 as discussed for steps 1306–1308, supra. At step 1510, in the subsequent alignment state, the imaging system focuses on the first layer 1552', and acquires and stores a third image S1-B. At step 1512, in the subsequent alignment state, the imaging system focuses on the second layer 1554, and acquires and stores a fourth image S2-B. Steps 1516–1518 proceed in a manner similar to steps 1314–1316 of FIG. 13 for determining the relative position shift VR.

Figures 1, 16:
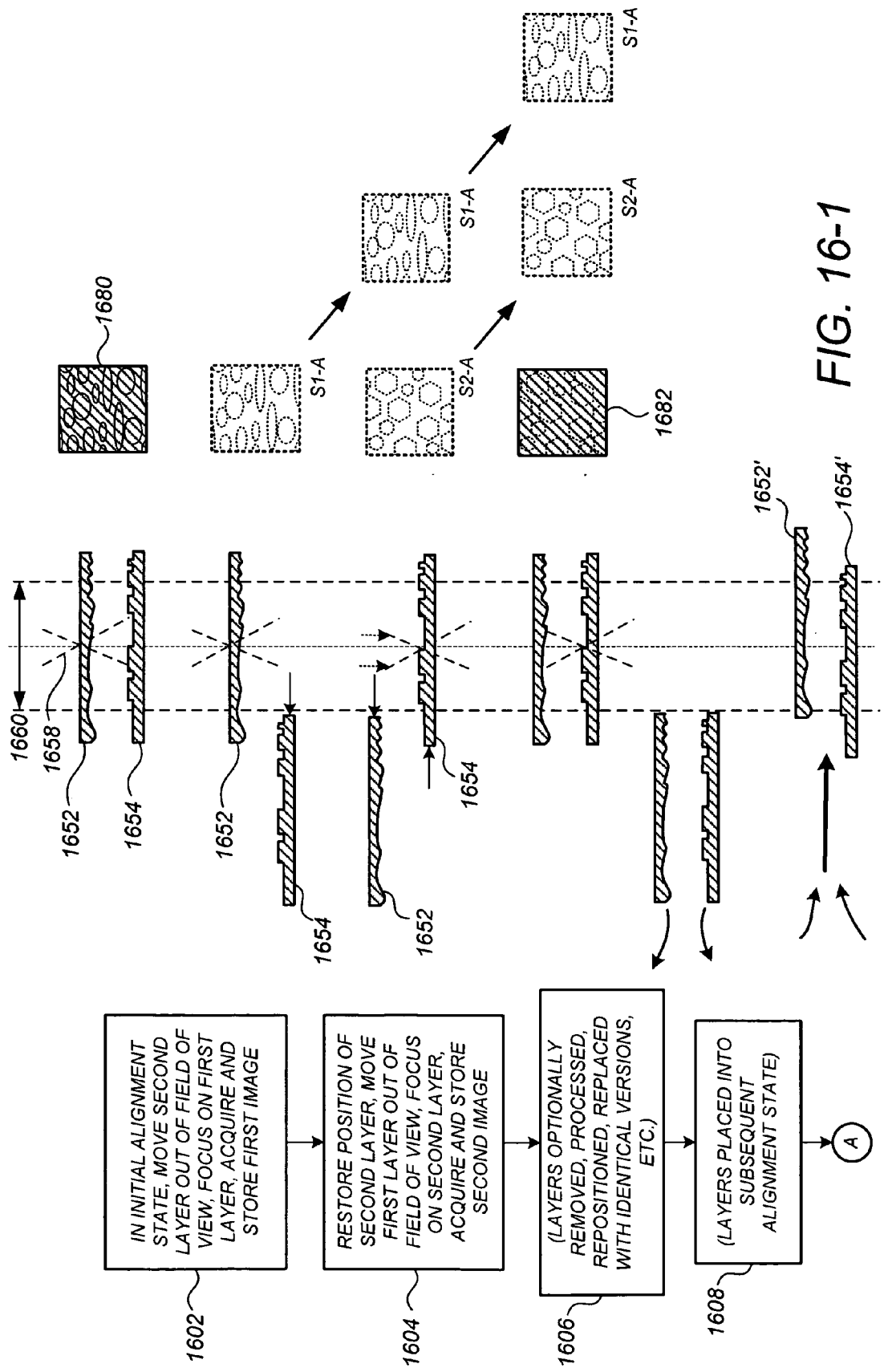
Figures 2, 16:
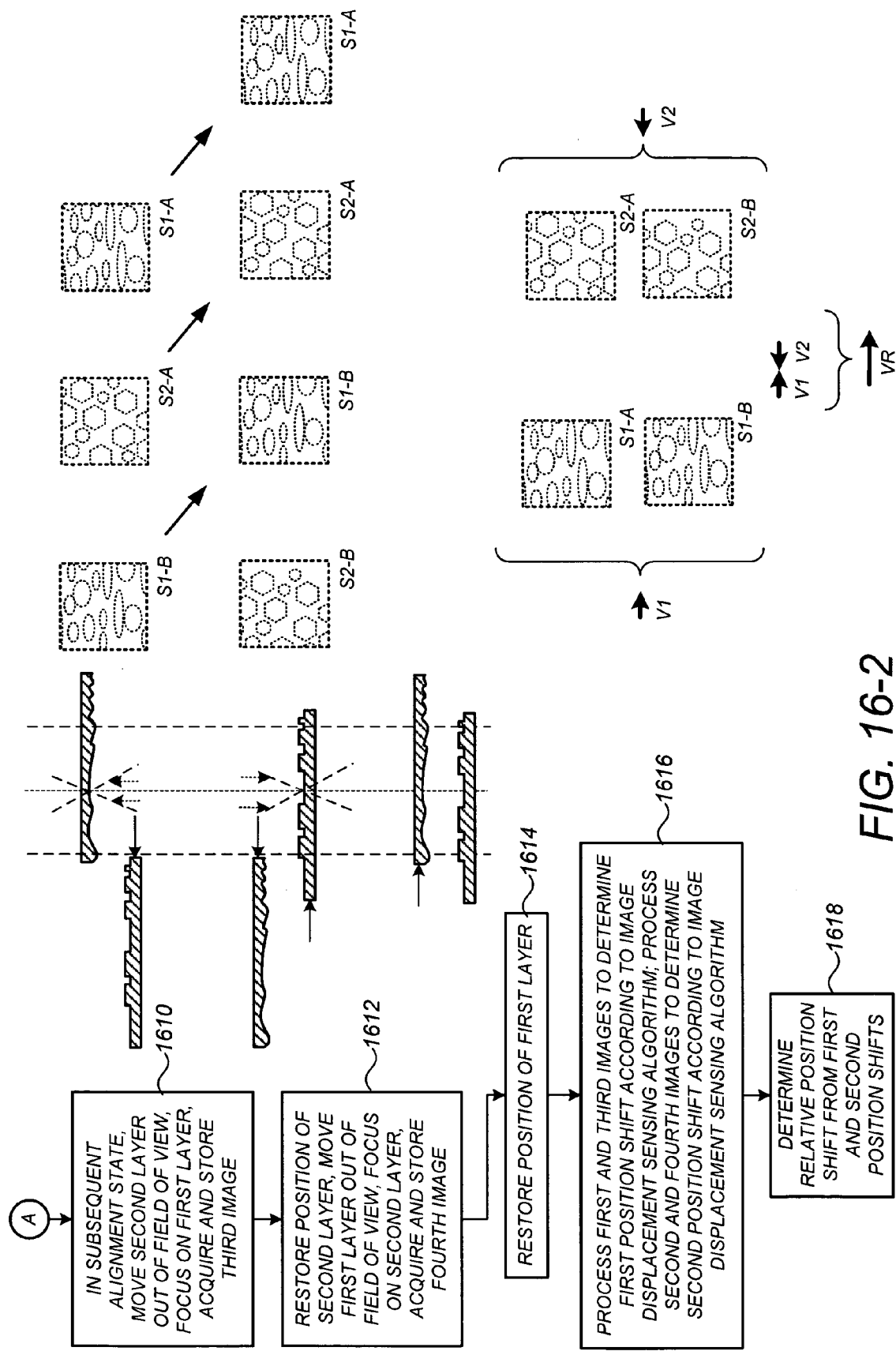

FIG. 16 illustrates determining a relative position shift between material layers according to an embodiment. FIG. 16 illustrates a first layer 1652 and a second layer 1654 in an initial alignment state within a field of view 1660 of an imaging system having a depth of focus less than the layer separation, as indicated by a wide hypothetical cone beam 1658. In this example, the layers at least partially obscure each other even though they lie in disparate focal zones. At step 1602, in an initial alignment state, the second layer 1654 is moved out of the field of view, and the imaging system focuses on the first layer 1652 and acquires and stores a first image S1-A. At step 1604, the position of the second layer 1654 is restored, the first layer 1652 is moved out of the field of view, and the imaging system focuses on the second layer 1654 and acquires and stores a second image S2-A. Intermediate processing/shuffling occurs at steps 1608—1608 similar to steps 1306–1308, supra. At step 1610, in the subsequent alignment state, the second layer 1654 is moved out of the field of view, and the imaging system focuses on the first layer 1652 and acquires and stores a third image S1-B. At step 1612, the position of the second layer 1654 is restored, the first layer 1652 is moved out of the field of view, and the imaging system focuses on the second layer 1654 and acquires and stores a fourth image S2-B. At step 1614, the position of the first layer 1652 is restored. Steps 1616–1618 proceed in a manner similar to steps 1314–1316 of FIG. 13 for determining the relative position shift VR. In other embodiments in which only a first layer partially obscures a second layer, the second layer not obscuring the first layer, an analogous subset of the steps of FIG. 16 are performed, and can be used where the obscuring layer lies above or below the obscured layer.

Figure 17:
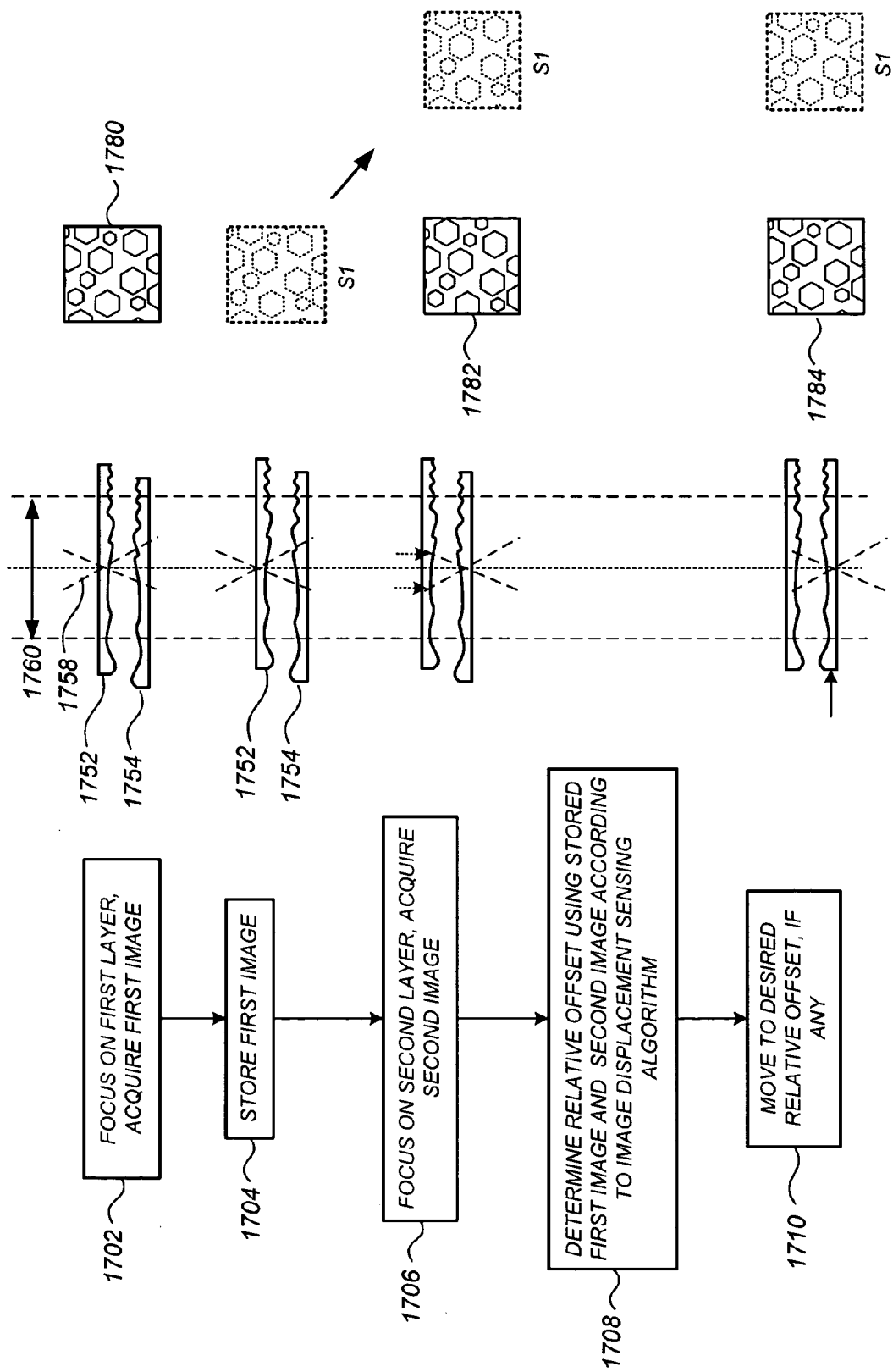
FIG. 17 illustrates determining alignment states according to an embodiment.

FIG. 17 illustrates alignment sensing according to an embodiment. FIG. 17 illustrates a first layer 1752 and a second layer 1754 in an initial alignment state within a field of view 1760 of an imaging system having a depth of focus less than the layer separation, as indicated by a wide hypothetical cone beam 1758. As with the example of FIGS. 10–11, supra, it is assumed the layers 1752 and 1754 are substantially identical as viewed by the imaging system. At step 1702, the imaging system focuses on the first layer 1752, and acquires a first image 1780 thereof. At step 1704, the first image is stored (S1). At step 1706 the imaging system focuses on the second layer 1154, and acquires a second image 1782 thereof. At step 1708 a relative offset between the first layer 1752 and the second layer 1754 is determined by processing the first stored image S1 and the second image 1782 according to an image displacement sensing algorithm, supra. If applicable, at step 1710 the layers are moved to a desired relative offset.

Figures 1, 18:
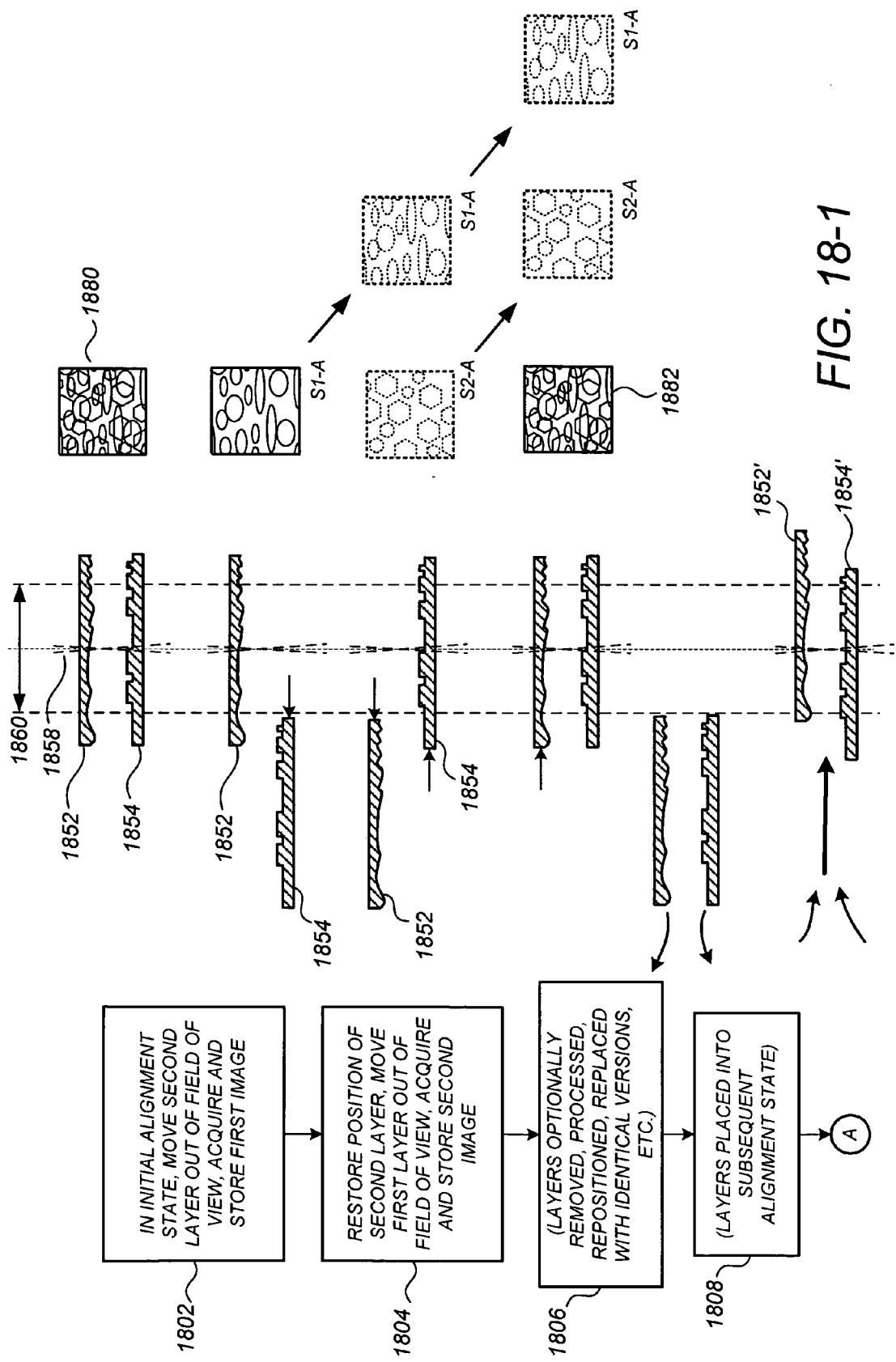
FIG. 18 illustrates determining a relative layer position shift according an embodiment.
Figures 2, 18:
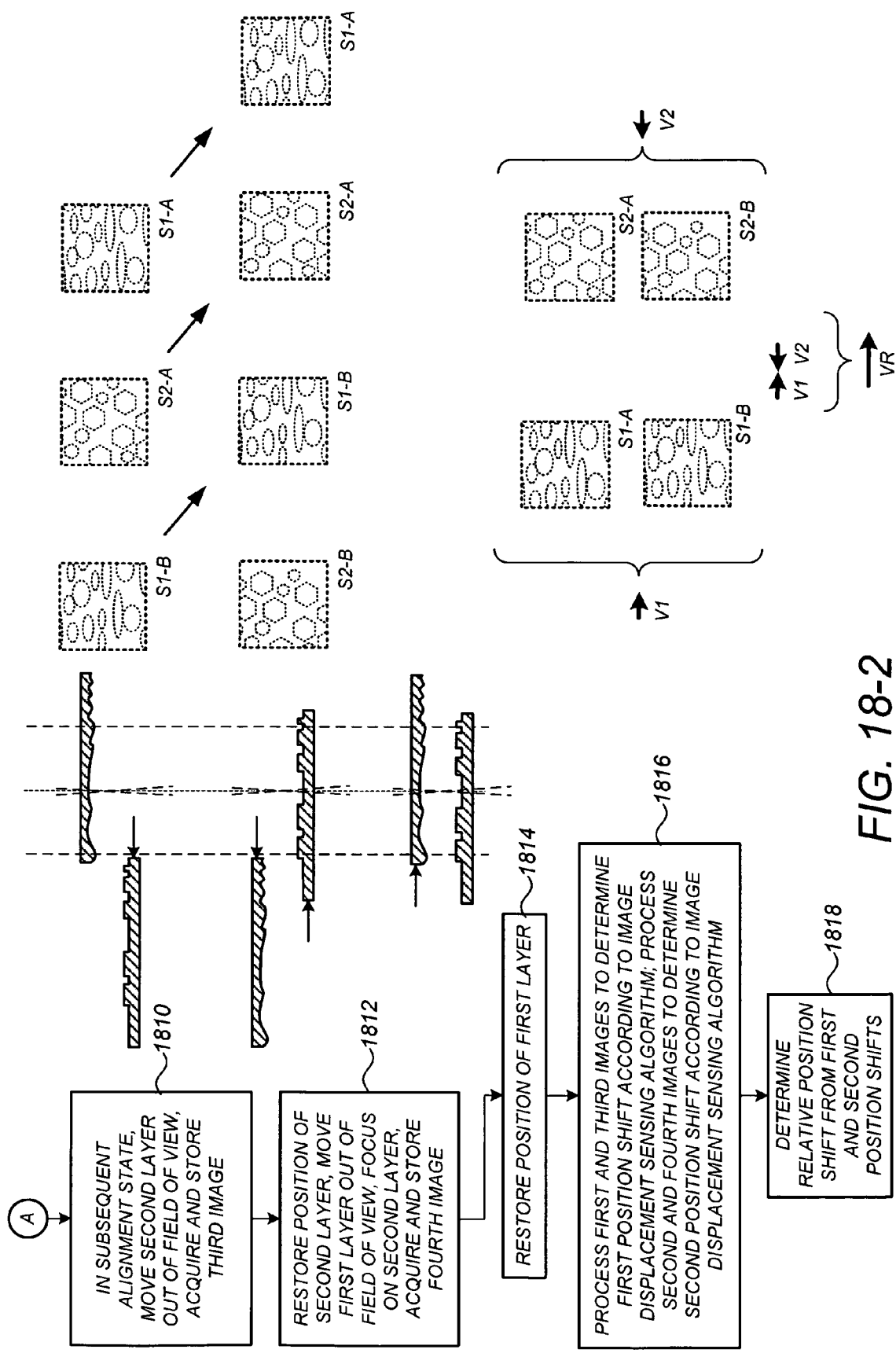

FIG. 18 illustrates determining a relative position shift between material layers according to an embodiment. FIG. 18 illustrates a first layer 1852 and a second layer 1854 in an initial alignment state within a field of view 1860 of an imaging system having a depth of focus greater than the layer separation, as indicated by a narrow hypothetical cone beam 1858. The layers at least partially obscure each other. At step 1802, in an initial alignment state, the second layer 1854 is moved out of the field of view, and the imaging system acquires and stores a first image S1-A of the first layer 1852. At step 1804, the position of the second layer 1854 is restored, the first layer 1852 is moved out of the field of view, and the imaging system acquires and stores a second image S2-A of the second layer 1854. Intermediate processing/shuffling occurs at steps 1808—1808 similar to steps 1306–1308, supra. At step 1810, in the subsequent alignment state, the second layer 1854 is moved out of the field of view, and the imaging system acquires and stores a third image S1-B of the first layer 1852. At step 1812, the position of the second layer 1854 is restored, the first layer 1852 is moved out of the field of view, and the imaging system acquires and stores a fourth image S2-B of the second layer 1854. At step 1814, the position of the first layer 1852 is restored. Steps 1816–1818 proceed in a manner similar to steps 1314–1316 of FIG. 13 for determining the relative position shift VR. In other embodiments in which only a first layer partially obscures a second layer, the second layer not obscuring the first layer, an analogous subset of the steps of FIG. 18 are performed, and can be used where the obscuring layer lies above or below the obscured layer.

It is to be appreciated that embodiments involving more than three layers are also within the scope of the present teachings. It is to be further appreciated that the present teachings are widely applicable in a variety of physical circumstances in which at least one of alignment sensing and control is desired. Examples include contact lithography, proximity lithography, nanoimprint lithography, or any of a variety of other processes relating to the fabrication or use of very small devices Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, image displacement sensing algorithm can refer to any of a variety of different image flow algorithms adapted for the rigid body assumption including, but not limited to, differential methods, tensor methods, correlation methods, phase methods, and error analysis methods. By way of further example, many combinations of the described embodiments are also within the scope of the present teachings, such as having a first layer without alignment markers whose first position shift is sensed using an image displacement sensing algorithm, and a second layer with an alignment marker whose second position shift is sensed according to alignment marker displacement, wherein the overall relative position shift is computed by vector subtraction of the first and second position shifts. Thus, reference to the details of the described embodiments are not intended to limit their scope.

What is claimed is:

1. An apparatus for facilitating positioning of a plurality of substantially parallel layers having an initial alignment state, comprising:
   an imaging system having an optical axis extending through said layers, a first of said layers at least partially obscuring a second of said layers with respect to said imaging system when in said initial alignment state;
   a positioning system displacing said first layer from a first position corresponding to said initial alignment state to a second position out of a field of view of the imaging system, said first layer being maintained out of said field of view as a first image is being acquired by said imaging system including at least a portion of said second material layer having a second-layer alignment marker thereon, said positioning system subsequently moving said first layer back to said first position to restore the initial alignment state;
   a memory storing said first image; and
   a processor retrieving said first image from said memory and receiving a second image acquired by said imaging system, the second image including at least a portion of said first layer having a first-layer alignment marker thereon, said processor processing said second image and said stored first image to determine said initial alignment state according to positions of said first-layer and second-layer alignment markers.

2. The apparatus of claim 1 wherein, subsequent to said processing by said processor, said positioning system moves said first layer to a third position corresponding to a desired second alignment state between said first and second material layers.

3. The apparatus of claim 2, wherein, subsequent to said moving of said first layer to said third position, said imaging system acquires a third image including said portion of said first layer having said first-layer alignment marker thereon, and said processor processes said third image and said stored first image to verify said desired second alignment state.

4. The apparatus of claim 1, said first and second layers being separated by a distance greater than a depth of field of the imaging system wherein, prior to the storing of the first image by said memory, correspondence is caused between a focal plane of the imaging system and said second layer, and prior to the acquisition of the second image by said imaging system, correspondence is caused between the focal plane of the imaging system and said first material layer.

5. The apparatus of claim 1, wherein said first layer is positioned below said second material layer relative to the imaging system.

6. The apparatus of claim 1, wherein said first layer is positioned above said second material layer relative to the imaging system.

7. The apparatus of claim 6, wherein said first layer is substantially opaque relative to the imaging system, wherein relevant surface patterns of said first layer are positioned on an underside thereof relative to the imaging system, and wherein said first-layer alignment marker comprises a through-hole extending from said underside to a top side of said first layer.

8. The apparatus of claim 1, said second material layer at least partially obscuring said first material layer in the initial alignment state, wherein:
   prior to the acquiring of the second image by the imaging system, the positioning system moves the second layer from a third position corresponding to said initial alignment state to a fourth position out of the field of view of the imaging system;
   subsequent to the acquisition of the second image by the imaging system, said memory stores said second image, and said processor uses said stored second image as the second image in said processing; and wherein
   said positioning system moves said second material layer back to said third position to restore said initial alignment state.

9. An apparatus for facilitating positioning of a plurality of substantially identical parallel layers having an initial alignment state, comprising:
   an imaging system having an optical axis extending through said layers, a first of said layers at least partially obscuring a second of said layers with respect to said imaging system when in said initial alignment state;
   a positioning system displacing said first layer from a first position corresponding to said initial alignment state to a second position out of a field of view of the imaging system, said first layer being maintained out of said field of view as a first image is being acquired by said imaging system including at least a portion of said second material layer, said positioning system subsequently moving said first layer back to said first position to restore the initial alignment state;
   a memory storing said first image; and
   a processor retrieving said first image from said memory and receiving a second image acquired by said imaging system, the second image including at least a portion of said first layer, said processor processing said second image and said stored first image to determine an initial relative offset between said first and second layers in said initial alignment state according to an image displacement sensing algorithm.

10. The apparatus of claim 9, wherein said image displacement sensing algorithm comprises at least one of a differential image flow algorithm, a tensor-based image flow algorithm, a correlation-based image flow algorithm, a phase-shift-based image flow algorithm, and an error analysis-based algorithm, each adapted for rigid-body flow.

11. The apparatus of claim 10, said second material layer at least partially obscuring said first material layer in the initial alignment state, wherein:
prior to the acquiring of the second image by the imaging system, the positioning system moves the second layer from a third position corresponding to said initial alignment state to a fourth position out of the field of view of the imaging system;
subsequent to the acquisition of the second image by the imaging system, said memory stores said second image, and said processor uses said stored second image as the second image in said processing; and wherein
said positioning system moves said second material layer back to said third position to restore said initial alignment state.

12. An apparatus for determining a relative position shift between a first layer and a second layer caused by a repositioning of said layers from an initial configuration to a subsequent configuration, comprising:
an imaging system having an optical axis extending through said layers, said layers being separated by a distance greater than a depth of field of the imaging system in each of said initial and subsequent configurations;
a memory storing a first image of at least a portion of the first layer acquired with the imaging system focused on the first layer in said initial configuration, the memory further storing a second image of at least a portion of the second layer acquired with the imaging system focused on the second layer in said initial configuration, the memory further storing a third image of said portion of the first layer acquired with the imaging system focused on the first layer in said subsequent configuration, the imaging system acquiring a fourth image of said portion of the second layer when focused thereon in said subsequent configuration; and
a processor processing said first and third images to determine a first position shift of said first layer between said initial and subsequent configurations, the processor further processing said second and fourth images to determine a second position shift of said second layer between said initial and subsequent configurations, said processor determining said relative position shift between said first and second layers according to said first and second position shifts.

13. The apparatus of claim 12, said first layer comprising a first-layer alignment marker in the imaged portion thereof, wherein said processor processes said first and third images to determine an absolute position of the first-layer alignment marker relative to the imaging system in each of said first and third images.

14. The apparatus of claim 13, said second layer comprising a second-layer alignment marker in the imaged portion thereof, wherein said processor processes said second and fourth images to determining an absolute position of the second-layer alignment marker relative to the imaging system in each of said second and fourth images.

15. The apparatus of claim 12, wherein said processor processes said first and third images according to an image displacement sensing algorithm, whereby said first position shift can be determined without requiring an alignment marker to be present in the imaged portion of the first layer.

16. The apparatus of claim 15, wherein said image displacement sensing algorithm comprises at least one of a differential image flow algorithm, a tensor-based image flow algorithm, a correlation-based image flow algorithm, a phase-shift-based image flow algorithm, and an error analysis-based algorithm, each adapted for rigid-body flow.

17. The apparatus of claim 16, wherein said processor processes said second and fourth images according to an image displacement sensing algorithm.

18. The apparatus of claim 12, said first layer comprising a first-layer alignment marker in the imaged portion thereof, wherein said processor processes said first and third images to determine an absolute position of the first-layer alignment marker relative to the imaging system in each of said first and third images, and wherein said processor processes said second and fourth images according to an image displacement sensing algorithm.

19. The apparatus of claim 12, wherein at least one of said first and second layers in said subsequent configuration comprises a substituted but substantially identical version of said first or second layer, respectively, in said initial configuration.

20. The apparatus of claim 12, said first layer at least partially obscuring said second layer in the initial configuration, said apparatus further comprising a positioning system, wherein prior to the acquisition of the second image by the imaging system, the positioning system moves the first layer from a first position corresponding to said initial configuration to a second position out of a field of view of the imaging system.

21. The apparatus of claim 20, the second layer at least partially obscuring the first layer in the initial configuration, wherein prior to the acquisition of the first image by the imaging system, the positioning system moves the second layer from a third position corresponding to said initial configuration to a fourth position out of the field of view of the imaging system.

22. The apparatus of claim 21, said first and second layers at least partially obscuring each other in the subsequent configuration, wherein:
prior to the acquisition of the third image by the imaging system, the positioning system moves the second layer from a fifth position corresponding to said subsequent configuration to a sixth position out of the field of view of the imaging system;
after the acquisition of the third image by the imaging system, the positioning system restores the second layer to said fifth position; and
prior to the acquisition of the fourth image, the positioning system moves the first layer from a seventh position corresponding to said subsequent configuration to an eighth position out of the field of view of the imaging system.

23. The apparatus of claim 12 wherein said positioning system moves at least one of said first and second layers toward a desired relative position therebetween based on said determined relative position shift.

24. The apparatus of claim 12, wherein said first layer is positioned above said second layer relative to the imaging system in each of said initial and subsequent configurations.

25. The apparatus of claim 12, wherein said second layer is positioned above said first layer relative to the imaging system in each of said initial and subsequent configurations.

26. An apparatus for position sensing in relation to a plurality of substantially identical parallel layers, comprising:
an imaging system having an optical axis extending through said layers, said imaging system having a depth of field less than a separation distance between a first of said layers and a second of said layers, said imaging system acquiring a first image including at least a portion of said first layer while focused on said first layer;

a memory storing said first image; and a processor retrieving said first image from said memory and receiving a second image acquired by said imaging system while focused on said second layer, the second image including at least a portion of said second layer, said processor processing said second image and said stored first image according to an image displacement sensing algorithm to determine a relative offset between said first and second layers.

27. The apparatus of claim 26, further comprising a positioning system moving said second layer to a desired offset relative to said first layer.

28. The apparatus of claim 26, wherein said image displacement sensing algorithm comprises at least one of a differential image flow algorithm, a tensor-based image flow algorithm, a correlation-based image flow algorithm, a phase-shift-based image flow algorithm, and an error analysis-based algorithm, each adapted for rigid-body flow.

29. An apparatus for determining a relative position shift between a first layer and a second layer caused by a repositioning of said layers from an initial configuration to a subsequent configuration, the first layer at least partially obscuring the second layer in the initial configuration, comprising:

an imaging system having an optical axis extending through said first and second layers, the imaging system acquiring a first image including at least a portion of the first layer in said initial configuration;

a positioning system displacing said first layer from a first position corresponding to said initial configuration to a second position out of a field of view of the imaging system, said first layer being maintained out of said field of view as a second image is being acquired by said imaging system including at least a portion of said second material layer, said positioning system subsequently moving said first layer back to said first position to restore the initial configuration;

a memory storing said first and second images, the memory further storing a third image of said portion of the first layer acquired by the imaging system in said subsequent configuration, the imaging system acquiring a fourth image of said portion of the second layer in said subsequent configuration;

a processor processing said first and third images to determine a first position shift of said first layer between said initial and subsequent configurations, the processor further processing said second and fourth images to determine a second position shift of said second layer between said initial and subsequent configurations, said processor determining said relative position shift between said first and second layers according to said first and second position shifts.

30. The apparatus of claim 29, said first layer comprising a first-layer alignment marker in the imaged portion thereof, wherein said processor processes said first and third images to determine an absolute position of the first-layer alignment marker relative to the imaging system in each of said first and third images.

31. The apparatus of claim 30, said second layer comprising a second-layer alignment marker in the imaged portion thereof, wherein said processor processes said second and fourth images to determining an absolute position of the second-layer alignment marker relative to the imaging system in each of said second and fourth images.

32. The apparatus of claim 29, wherein said processor processes said first and third images according to an image displacement sensing algorithm, whereby said first position shift can be determined without requiring an alignment marker to be present in the imaged portion of the first layer.

33. The apparatus of claim 32, wherein said image displacement sensing algorithm comprises at least one of a differential image flow algorithm, a tensor-based image flow algorithm, a correlation-based image flow algorithm, a phase-shift-based image flow algorithm, and an error analysis-based algorithm, each adapted for rigid-body flow.

34. The apparatus of claim 33, wherein said processor processes said second and fourth images according to an image displacement sensing algorithm.

35. The apparatus of claim 29, said first layer comprising a first-layer alignment marker in the imaged portion thereof, wherein said processor processes said first and third images to determine an absolute position of the first-layer alignment marker relative to the imaging system in each of said first and third images, and wherein said processor processes said second and fourth images according to an image displacement sensing algorithm.

36. The apparatus of claim 29, wherein at least one of said first and second layers in said subsequent configuration comprises a substituted but substantially identical version of said first or second layer, respectively, in said initial configuration.

37. The apparatus of claim 29, the second layer at least partially obscuring the first layer in the initial configuration, wherein prior to the acquisition of the first image by the imaging system, the positioning system moves the second layer from a third position corresponding to said initial configuration to a fourth position out of the field of view of the imaging system.

38. The apparatus of claim 37, said first and second layers at least partially obscuring each other in the subsequent alignment, wherein:

prior to the acquisition of the third image by the imaging system, the positioning system moves the second layer from a fifth position corresponding to said subsequent configuration to a sixth position out of the field of view of the imaging system;

after the acquisition of the third image by the imaging system, the positioning system restores the second layer to said fifth position; and prior to the acquisition of the fourth image, the positioning system moves the first layer from a seventh position corresponding to said subsequent configuration to an eighth position out of the field of view of the imaging system.

39. The apparatus of claim 29 wherein said positioning system moves at least one of said first and second layers toward a desired relative position therebetween based on said determined relative position shift.

40. The apparatus of claim 29, wherein said second layer is positioned above said first layer relative to the imaging system in each of said initial and subsequent configurations.

* * * * *